(12) United States Patent
Zhang et al.

(10) Patent No.: US 7,050,671 B1
(45) Date of Patent: May 23, 2006

(54) TUNABLE COMPENSATION OF CHROMATIC DISPERSION USING ETALONS WITH TUNABLE OPTICAL PATH LENGTH AND NON-TUNABLE REFLECTIVITY

(75) Inventors: Qin Zhang, San Jose, CA (US); Jianzhong Zhang, Palo Alto, CA (US); Hongwei Mao, Fremont, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 275 days.

(21) Appl. No.: 10/346,653

(22) Filed: Jan. 17, 2003

(51) Int. Cl.
G02B 6/26 (2006.01)

(52) U.S. Cl. ............... 385/27; 385/15; 385/31; 385/39

(58) Field of Classification Search ........... 385/27, 385/31, 39, 15
See application file for complete search history.

(56) References Cited

U.S. PATENT DOCUMENTS

| | | | |
|---|---|---|---|
| 5,384,877 A * | 1/1995 | Stone | 385/70 |
| 5,557,468 A | 9/1996 | Ip | |
| 5,828,689 A | 10/1998 | Epworth | |
| 6,115,121 A | 9/2000 | Erskine | |
| 6,683,721 B1 * | 1/2004 | Copner et al. | 359/618 |
| 2003/0021526 A1 * | 1/2003 | Bouevitch | 385/24 |

FOREIGN PATENT DOCUMENTS

| | | |
|---|---|---|
| EP | 0426357 B1 | 4/1996 |
| EP | 0997751 A2 | 5/2000 |

OTHER PUBLICATIONS

Cimini, L.J., Jr., et al., "Optical Equalization for High-Bit-Rate Fiber-Optic Communications," *IEEE Photonics Technology Letters*, vol. 2, No. 3 (Mar. 1990), pp. 200-202.

Cimini, Leonard J., Jr., et al., "Optical Equalization to Combat the Effects of Laser Chirp and Fiber Dispersion," *Journal of Lightwave Technology*, vol. 8, No. 5 (May 1990), pp. 649-659.

French, P.M.W., et al., "Tunable Group Velocity Dispersion Interferometer for Intracavity and Extracavity Applica (Continued)

Primary Examiner—Jennifer Doan
(74) Attorney, Agent, or Firm—Allen, Dyer, Doppelt, Milbrath & Gilchrist, P.A.

(57) ABSTRACT

A dispersion compensation system includes one or more etalons optically coupled in series. The optical path length is used to achieves the desired dispersion compensation. In one example, at least some of the etalons are tunable in OPL and have a non-tunable front reflective interface. The dispersion compensation system can be tuned, for example to compensate for different amounts of dispersion, different combinations of dispersion offset and dispersion slope and/or manufacturing variations. In another example, the etalons all have a non-tunable front reflective interface. The optical path length is selected to compensate for chromatic dispersion that varies from one wavelength channel to the next.

44 Claims, 27 Drawing Sheets

OTHER PUBLICATIONS tions," *Optics Communications*, vol. 57, No. 4 (Mar. 15, 1986), pp. 263-268.

Garthe, D., et al., "Low-loss dispersion equaliser operable over the entire erbium window," *Electronics Letters*, vol. 32 (1996), pp. 371-373.

Gnauck, A.H., et al., "8-Gb/s-130 km Transmission Experiment Using Er-Doped Fiber Preamplifier and Optical Dispersion Equalization," *IEEE Transactions Photonics Technology Letters*, vol. 3, No. 12 (Dec. 1991), pp. 1147-1149.

Gnauck, A.H., et al., "Optical Equalization of Fiber Chromatic Dispersion in a 5-Gb/s Transmission System," *IEEE Photonics Technology Letters*, vol. 2, No. 8 (Aug. 1990), pp. 585-587.

MacFarlane, Duncan L., et al., "Z-domain techniques in the analysis of Fabry-Perot étalons and multilayer structures," *Journal of the Optical Society of America A*, vol. 11, No. 1 (Jan. 1994), pp. 236-245.

Madsen, C.K., et al., "A Tunable Dispersion Compensating MEMS All-Pass Filter," *IEEE Photonics Technology Letters*, vol. 12, No. 6 (Jun. 2000), pp. 651-653.

Madsen, C.K., et al., "Integrated All-Pass Filters for Tunable Dispersion and Dispersion Slope Compensation," *IEEE Photonics Technology Letters*, vol. 11, No. 12 (Dec. 1999), pp. 1623-1625.

Madsen, C.K., et al., "Optical All-Pass Filters for Phase Response Design with Applications for Dispersion Compensation," *IEEE Photonics Technology Letters*, vol. 10, No. 7 (Jul. 1998), pp. 994-996.

Saleh, A.A.M., et al., "Two-Stage Fabry-Perot Filters as Demultiplexers in Optical FDMA LAN's," *Journal of Lightwave Technology*, vol. 7, No. 2 (Feb. 1989), pp. 323-329.

Skinner, Wilbert R., et al., "Optimization of a triple etalon interferometer," *Applied Optics*, vol. 26, No. 14 (Jul. 15, 1987), pp. 2817-2827.

\* cited by examiner

| Dispersion (ps/nm) | p₁ | p₂ | p₃ | p₄ | Ripple (ps) |
|---|---|---|---|---|---|
| -500 | -0.5242 | -0.346 | -0.0484 | 0.0104 | 4.32282 |
| -450 | -0.5314 | -0.3154 | 0.1316 | -0.0995 | 1.84988 |
| -400 | -0.6039 | -0.3654 | 0.1341 | -0.1547 | 1.59832 |
| -350 | -0.6406 | -0.3824 | -0.1591 | 0.1726 | 1.46195 |
| -300 | -0.8153 | -0.5085 | -0.2673 | 0.0965 | 1.81129 |
| -250 | -0.9581 | -0.5421 | -0.2938 | 0.1051 | 1.89477 |
| -200 | 0.9311 | -0.5449 | -0.2645 | 0.1486 | 1.77608 |
| -150 | 0.874 | -0.5325 | -0.2049 | 0.2079 | 1.43924 |
| -100 | 0.8235 | -0.5106 | -0.1311 | 0.2492 | 1.63231 |
| -50 | 0.8533 | -0.7871 | -0.2902 | 0.2151 | 1.4906 |
| 0 | 0.8458 | -0.8128 | -0.2266 | 0.2818 | 1.17186 |

FIG. 5A

| fiber type | dispersion ps/nm | OPL (mm) | | | | Phase tuning factor | | | |
|---|---|---|---|---|---|---|---|---|---|
| | | 1 | 2 | 3 | 4 | 1 | 2 | 3 | 4 |
| True Wave Classic | 104 –288 | 5.9841 | 5.9895 | 5.9980 | 5.9959 | 0.159 | -0.422 | -0.581 | -0.390 |
| True Wave Plus | 176 - 368 | 5.9847 | 5.9907 | 5.9991 | 5.9949 | -0.403 | 0.135 | -0.025 | 0.955 |
| E-LEAF | 208 - 440 | 5.9816 | 5.9848 | 5.9955 | 5.9897 | -0.308 | -0.149 | 0.542 | 0.337 |
| LEAF | 144 - 424 | 5.9797 | 5.9850 | 5.9970 | 5.9912 | 0.023 | -0.505 | 0.655 | -0.264 |
| True Wave RS | 280 - 408 | 5.9841 | 5.9895 | 5.9980 | 5.9959 | 0.965 | 0.410 | -0.346 | -0.967 |

FIG. 7A

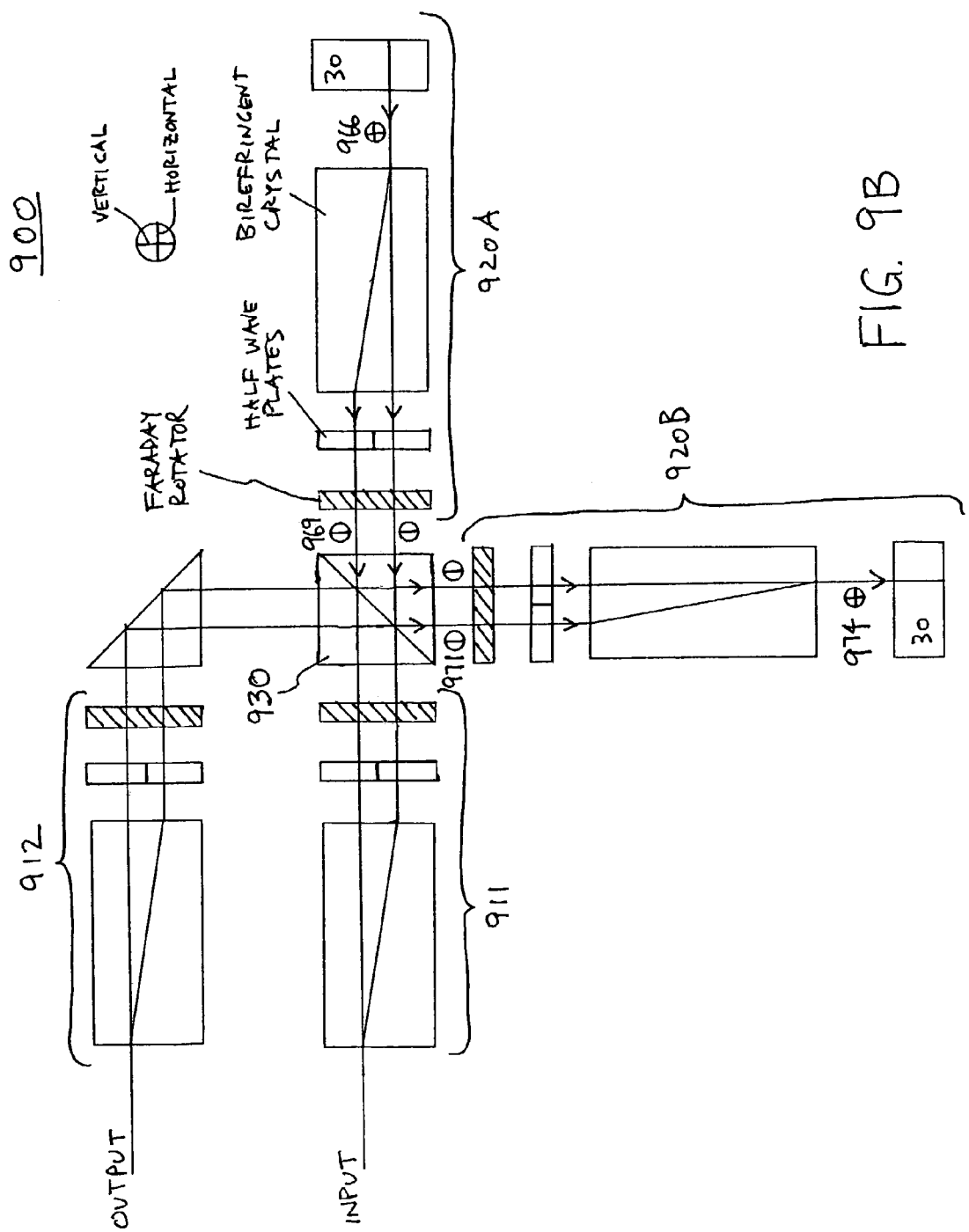

TUNABLE COMPENSATION OF CHROMATIC DISPERSION USING ETALONS WITH TUNABLE OPTICAL PATH LENGTH AND NON-TUNABLE REFLECTIVITY

BACKGROUND OF THE INVENTION

1. Field of the Invention

This invention relates generally to compensation of chromatic dispersion, including for example compensation of dispersion slope. More specifically, this invention relates to the use of etalons to compensate for chromatic dispersion.

2. Description of the Related Art

As the result of recent advances in technology and an ever-increasing demand for communications bandwidth, there is increasing interest in optical communications systems, especially fiber optic communications systems. This is because optical fiber is a transmission medium that is well suited to meet the demand for bandwidth. Optical fiber has a bandwidth, which is inherently broader than its electrical counterparts. At the same time, advances in technology have increased the performance, increased the reliability and reduced the cost of the components used in fiber optic systems. In addition, there is a growing installed base of laid fiber and infrastructure to support and service the fiber.

However, even fiber optic systems have limits on price and performance. Chromatic dispersion is one basic phenomenon, which limits the performance of optical fibers. The speed of a photon traveling along an optical fiber depends on the index of refraction of the fiber. Because the index of refraction is slightly dependent on the frequency of light, photons of different frequencies propagate at different speeds. This effect is commonly known as chromatic dispersion. Chromatic dispersion causes optical signal pulses to broaden in the time domain. In addition, chromatic dispersion is cumulative in nature. Therefore, optical signals, which travel longer distances, will experience more chromatic dispersion. This limits the signal transmission distance over which high bit rate signals can be transmitted, even with the use of narrow linewidth lasers and low chirp external modulators. For instance, signals at 10 Gbps can travel roughly 80 km in a standard SMF-28 single mode fiber before adjacent digital bits start to interfere with each other. At 40 Gbps, this distance is reduced to 6 km. Chromatic dispersion is a significant problem in implementing high-speed optical networks.

Several different approaches have been proposed to compensate for the effects of chromatic dispersion and, therefore, extend the signal transmission distance. They include systems based on dispersion compensating fiber, fiber Bragg gratings, photonic integrated circuits and etalons.

Dispersion compensating fibers (DCF) are optical fibers which have chromatic dispersion which is opposite in sign to the chromatic dispersion in "normal" fibers. Thus, propagation through a length of DCF cancels the chromatic dispersion, which results from propagating through standard single mode fiber. At the present time, DCF is one of the leading commercial technologies for the compensation of chromatic dispersion and a significant number of chromatic dispersion compensating devices is based on DCF. However, DCF has several significant disadvantages. First, long lengths of DCF are required to compensate for standard fiber. For example, a typical application might require 1 km of DCF for every 5 km of standard fiber. Thus, 100 km of standard fiber would require 20 km of DCF. These amounts of DCF are both expensive and bulky. Second, DCF solutions are static. A 20 km length of DCF will introduce a specific amount of dispersion compensation. If more or less is required, for example due to changes in the overall network architecture, a different DCF solution must be engineered. The existing 20 km of DCF cannot be easily "tuned" to realize a different amount of dispersion compensation, making it unsuitable for agile telecommunications network applications. Third, DCF is a type of fiber and suffers from many undesirable fiber characteristics, typically including undesirable fiber nonlinearities and high losses. A 20 km length of fiber can introduce significant losses. Fourth, standard single mode fibers have non-uniform dispersion values over a wide bandwidth, resulting in a second-order dispersion effect commonly referred to as dispersion slope. DCF solutions typically do not compensate for dispersion slope, leaving behind some uncompensated residual dispersion.

Fiber Bragg gratings (FBG) have emerged over the past few years as a promising candidate for the compensation of chromatic dispersion. A fiber Bragg grating is a length of fiber into which Bragg gratings have been formed. Various groups have proposed different architectures for using FBGs to compensate for chromatic dispersion. For example, see FIG. 1 in C. K. Madsen and G. Lenz, "Optical all-pass filters for phase response design with applications for dispersion compensation," *IEEE Photonics Technology Letters*, vol. 10, no. 7, July 1998, pp. 994–996. However, practical implementation of FBG solutions remains difficult. Engineering limitations have resulted in less than acceptable dispersion compensation. Finding reproducible and reliable processes to make a dispersion compensator based on FBGs remains very challenging. In addition, Bragg gratings are inherently narrow band devices so FBG-based dispersion compensators typically have a narrow operating bandwidth. It is also difficult to tune FBGs to achieve different amounts of dispersion compensation.

Architectures based on planar waveguides have also been proposed. For example, the paper referenced above suggests an approach for compensating for chromatic dispersion using an all-pass filter approach based on ring structures in planar waveguides. However, this approach is inherently expensive and polarization sensitive.

Finally, around 1990, it was disclosed that the phase response of a single etalon has a nonlinear relationship with frequency. See L. J. Cimini Jr., L. J. Greenstein and A. A. M. Saleh, "Optical equalization to combat the effects of laser chirp and fiber dispersion," J. Lightwave Technology, vol. 8, no. 5, May 1990, pp. 649–659. Furthermore, it was proposed that an etalon could be used to compensate for chromatic dispersion. Since that time, various etalon-based architectures have been suggested. However, most, if not all, of these architectures suffer from significant drawbacks. Many of them simply cannot attain the necessary performance. They often suffer from too much group delay ripple (e.g., >20 ps) and/or too narrow an operating bandwidth. In addition, most, if not all, designs are static. The designs cannot be easily tuned to achieve different amounts of dispersion compensation. In addition, they typically do not adequately compensate for dispersion slope.

Thus, there is a need for dispersion compensation systems, which can be tuned to achieve different amounts of dispersion compensation, including different amounts of dispersion slope compensation for some applications. It is also desirable for these systems to operate over a large bandwidth and to be capable of achieving low group delay ripple.

SUMMARY OF THE INVENTION

The present invention overcomes the limitations of the prior art by providing a dispersion compensation system in which two or more etalon stages are optically coupled in series. The etalon stages introduce a cumulative group delay that compensates for chromatic dispersion. The reflectivities of the etalons in the etalon stages are not tunable. The optical path length (OPL) within the etalon is tunable for dispersion compensation systems that can be tuned to compensate for different chromatic dispersions. Alternately, the OPL can be fixed for systems that compensate for a given chromatic dispersion (e.g., a given dispersion slope and dispersion offset). Some implementations can be operated bi-directionally.

In one implementation, each etalon stage includes an input port, an output port, and an etalon located in the optical path from the input port to the output port. In at least two of the etalon stages, the reflectivity of the front reflective interface of the etalon is non-tunable, but the OPL of the etalon is tunable. Within its operating bandwidth, the dispersion compensation system can be tuned to compensate for at least two different chromatic dispersions by tuning the OPLs of the etalons. The reflectivities are selected to enable this tunability. In one embodiment, all of the etalon stages have etalons with a non-tunable reflectivity of the front reflective interface and a tunable OPL.

The tunability feature is used to compensate for different chromatic dispersions. For example, the system can be tuned over a range of chromatic dispersions, for example ranging from −500 ps/nm to +500 ps/nm. The system can also be used in multi-channel applications where the operating bandwidth includes a number of evenly spaced channels (e.g., channels on 50 GHz or 100 GHz centers, as specified by the ITU grid as defined in ITU G.692 Annex A of COM 15-R 67-E). If all channels experience the same dispersion, the single channel design can be expanded to multiple channels by designing the etalons so that their free spectral range (FSR) matches the channel spacing.

In many cases, there will be channel-to-channel variations in the chromatic dispersion. For example, a system might be designed to compensate for different types of fiber, each of which is characterized by a different dispersion slope and dispersion offset. In this case, the OPL of each etalon can be tuned so that the FSR is slightly offset relative to the channel spacing, typically within 5% of the channel spacing. This introduces a wavelength-dependent variation that can be used to match the channel-to-channel variations in the chromatic dispersion.

In another implementation of the invention, the etalons all have non-tunable reflectivities and the system is used in a multi-channel application. The system compensates for channel-to-channel variations of the chromatic dispersion. The system may or may not be tunable and the OPLs of the etalons may or may not be tunable.

The etalon stages themselves can also differ in design. In one approach, OPL tunability is achieved by changing the temperature of the etalon. Alternately, the OPL is designed to be athermal, for example effects due to thermal expansion can be used to counteract effects resulting from thermally-induced changes in refractive index. In this case, OPL tuning is achieved by some other means. For example, one etalon design includes an air space with a transparent plate located in the air space. Tilting the transparent plate tunes the OPL.

Coupling to the etalons can also be achieved in different ways. In one approach, the etalon stage includes a fiber circulator and a single fiber collimator located between the input and output ports and the etalon. In a different design, the etalon stage uses a dual fiber collimator and a free space circulator instead. In another approach, no circulator is used.

In yet another design, a free space approach uses polarization multiplexing to couple optical signals between the etalon stages. The dispersion compensation system includes an input polarization beam displacer, an output polarization beam combiner and polarization beam splitter(s). The input polarization beam displacer separates an unpolarized input optical beam into two laterally separated component beams that have the same polarization. The polarization beam splitter(s) direct the component beams from the input beam displacer through the etalon stages to the output beam combiner. Each etalon stage rotates the polarization of the component beams to an orthogonal polarization. The output polarization beam combiner combines the components beams into an unpolarized output optical beam. In one approach, the polarization beam displacer/combiners and/or etalon stages are based on Faraday rotators and birefringent crystals. Equalizing the optical paths traversed by the two component beams reduces any additional polarization mode dispersion.

Other aspects of the invention include etalons and etalon stages suitable for use in the systems described above, and methods related to the foregoing, including methods for designing etalons, etalon stages and the overall system.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 5A is a table listing phase offsets for realizing different values of chromatic dispersion.

FIG. 7A is a table listing OPL and interface phase factor for compensating for five different types of fiber.

FIGS. 9A, 9B and 9C are a top view of a dispersion compensation system using polarization multiplexing.

DETAILED DESCRIPTION OF THE PREFERRED EMBODIMENTS

Figure 1:
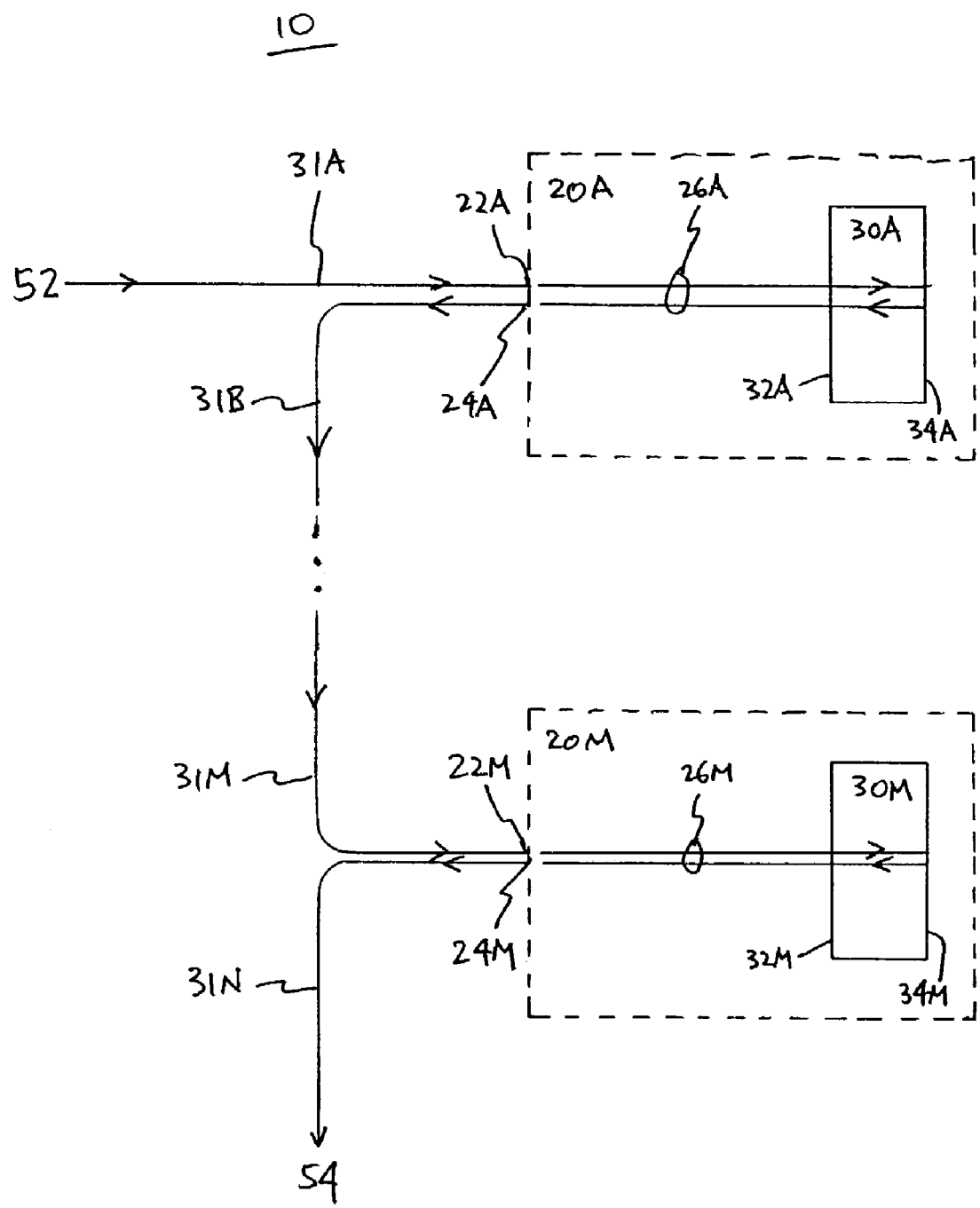
FIG. 1 is a block diagram of a dispersion compensation system according to the invention.

FIG. 1 is a block diagram of a dispersion compensation system 10 according to the invention. The system includes two or more etalon stages 20A–20M, each including an input port 22, an output port 24 and an etalon 30. Within the etalon stage 20, light travels along an optical path 26 from the input port 22, through the etalon 30 to the output port 24.

The etalon stages 20 are optically coupled in series. In particular, the output port 24A of etalon stage 20A is coupled to the input port 22B of the next etalon stage 20B in the chain, and so on to the last etalon stage 20M. The input port 22A of the first etalon stage 20A serves as the input of the overall system 10 and the output port 24M of the last etalon stage 20M serves as the output of the overall system 10.

In the example of FIG. 1, the etalon stages 20 are coupled by optical fibers 31 and light propagates through the system 10 as follows. Light enters the system 10 at input 52 and is directed by fiber 31A to etalon stage 20A, where it propagates through etalon 30A. Upon exiting etalon stage 20A, the light enters fiber 31B, which directs the light to the next etalon stage 20B. The light propagates through the etalon stages 20 until it finally exits at output 54. In alternate embodiments, means other than optical fibers 31 (including for example free space) couple the etalon stages 20 to each other. In addition, the input and output ports 22, 24 need not be separate devices. For example, they could simply be the location where the light enters or exits the etalon stage 20. Additional optical devices can also be located in the optical path. For example, lenses and mirrors can be used to focus, defocus and/or direct the light along the optical path. Splitters and combiners, wavelength filters and isolators can provide additional processing of the light. These devices are omitted in FIG. 1 for clarity.

Each etalon 30 has a front reflective interface 32 and a back reflective interface 34. In some implementations, the reflectivity of the front reflective interface 32 is not tunable. Rather, it is fixed, although it may vary as a function of wavelength. In addition, the front reflective interfaces 32 for at least two of the etalon stages have a different reflectivity, although two or more etalon stages may also have the same reflectivity. The optical path length (OPL) of the etalons 30 is tunable. In one approach, this is achieved by making the OPL of each etalon 30 tunable. Thus, the group delay introduced by each such etalon 30 can be varied by tuning the OPL of the etalon 30. This, in turn, allows the dispersion compensation provided by the overall system 10 to be tuned. The overall system 10 is designed so that within its operating bandwidth, the system can be tuned over a range of chromatic dispersions by tuning the OPLs of the etalons (possibly in connection with additional other parameters).

Figure 2A:
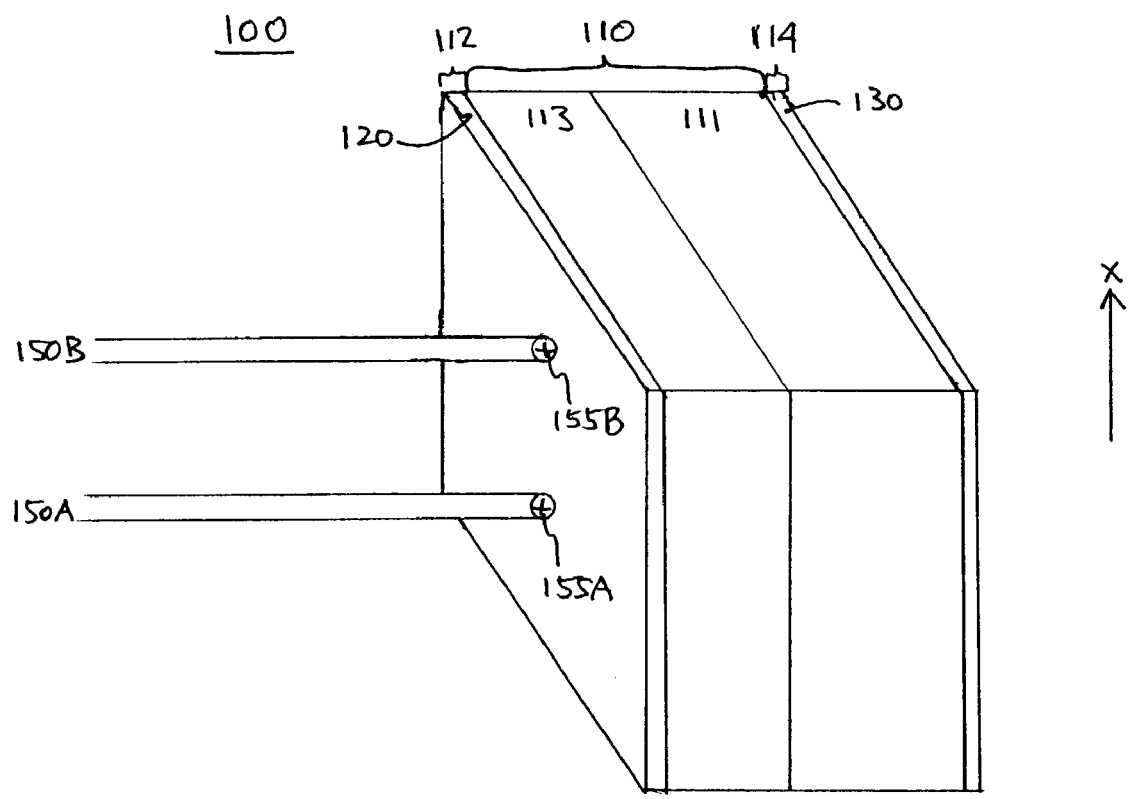
FIG. 2A is a perspective view of an etalon suitable for use in the dispersion compensation system of FIG. 1.
Figure 2B:
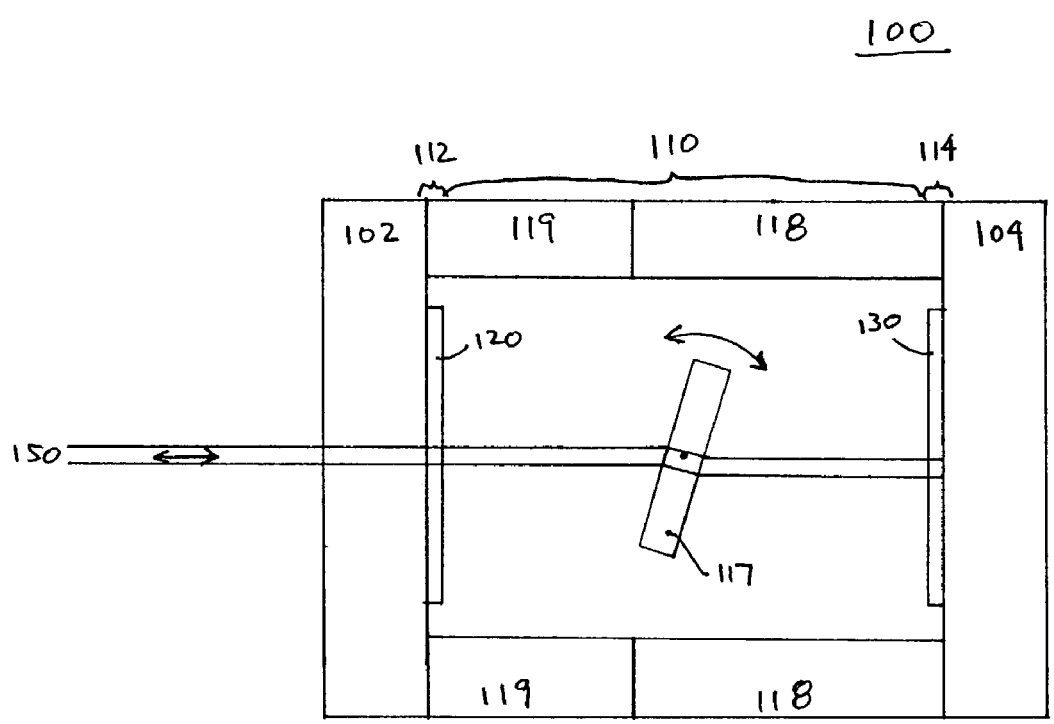
FIG. 2B is a side view of an etalon suitable for use in the dispersion compensation system of FIG. 1.

FIGS. 2A–2B show etalons 100 (labeled as etalon 30 in FIG. 1) with a tunable optical path length. The optical path length is the optical path length of one round trip through the etalon 100. In cases where the body of the etalon is constructed of a single block of material with refractive index n and thickness L, the OPL=2 n L. The OPL can be tuned by varying the refractive index of the etalon material and/or the physical thickness of the etalon material. This can be achieved in many different ways.

In FIG. 2A, the etalon 100 includes a transparent body 110 having a front reflective interface 112 and a back reflective interface 114 that are substantially plane-parallel. In FIG. 2A, the transparent body 110 includes a material 111 with a variable index of refraction bonded to a material 113 with a constant index of refraction. In one implementation for the 1.55 µm region, liquid crystal is used as the variable index material 111 and an air gap, fused silica, BK7 or similar glass is used as the constant index material 113. The OPL of the etalon 100 is tuned by varying the refractive index of material 111. For example, a voltage applied across the liquid crystal material 111 can be used to vary the index of the material, thus changing the OPL. Alternately, the refractive index and/or the physical length of the variable index material 111 can vary by location, and the optical beam 150 is mechanically translated to different locations in order to tune the OPL, for example from point of incidence 155A to point of incidence 155B as shown in FIG. 2A. In a different approach, changing the temperature of the material 111 varies its refractive index, thus tuning the OPL.

In other implementations, the transparent body 110 can be constructed differently. For example, it can be made from a single block of material. Alternately, it can be made from blocks of different materials, as shown in FIG. 2A. For example, different materials can be bonded together to form a sandwich-type structure for the transparent body 110.

Alternately, some or all of the transparent body 110 can be formed by an air space. In one implementation, in order from front reflective interface 112 to back reflective interface 114, the transparent body 110 includes a first block of material, an air space, and a second block of material. The air space is maintained by spacers between the two blocks of material. In one variation, the air space is variable in length, thus allowing the optical path length of the etalon to be tuned. For example, piezo-electric spacers can be used to vary the length of the air space.

In the variation of FIG. 2B, the etalon 100 is athermal. In this case, from front to back, the etalon includes a front coating substrate 102, a front reflective interface 112, an air space 110, a back reflective interface 114, and a back coating substrate 104. The front reflective interface 112 includes a front coating 120, which is supported by the front coating substrate 102. Similarly, the back reflective interface 114 includes a back coating 130 supported by the back coating substrate 104. A transparent plate 117 is located in the air gap 110. For example, the plate 117 can be a thin plate (typically 100–200 µm in thickness for this example) made of fused silica. The front reflective interface 112 and back reflective interface 114 determine the etalon cavity. Other surfaces in the optical path (e.g., both surfaces of the transparent plate 117 and the front surface of the front coating substrate 102) preferably are anti-reflection coated. The air gap 110 and transparent plate 117 determine the optical path length for the etalon. The coating substrates 102 and 104 are not part of the etalon cavity in this example, although they could be in other implementations.

The support structure for the etalon 100 further includes spacers to maintain the air space 110 between the two coating substrates 102, 104. The spacers are designed so that the OPL of the etalon does not fluctuate with temperature. A temperature increase will cause an increase in the refractive index for the transparent plate 117, thus increasing the optical path length of the etalon in the absence of any compensating factors. The spacers are designed with a negative coefficient of thermal expansion so that, as the temperature increases, the physical length of the air gap decreases. The two effects compensate for each other and the optical path length and FSR remain constant during temperature fluctuations.

In the example shown in FIG. 2B, the spacers are made from two glass materials 118 and 119. Material 118 is regular Zerodur glass with a zero coefficient of thermal expansion. Material 119 is a glass with a negative coefficient of thermal expansion, for example NEX-C type glass available from Ohara Corporation. The dimensions of material 119 are chosen to balance the thermally induced change in refractive index for the transparent plate 117.

The transparent plate 117 is used to fine tune the OPL. The optical path length can be varied by tilting the transparent plate 117, which in FIG. 2B is achieved by rotating the plate 117 about an axis. In one approach, the etalon is tuned to the desired OPL by tilting the transparent plate 117 and then the plate is fixed in that position. The athermal design stabilizes the etalon performance in the face of temperature fluctuations. In an alternate approach, the OPL is dynamically tunable, for example to compensate for different chromatic dispersions as described below.

For both FIGS. 2A–2B, the front and back reflective interfaces 112 and 114 are substantially plane-parallel in the sense that an optical beam 150 that is normally incident upon the front reflective interface 112 also strikes the back reflective interface 114 at an approximately normal angle of incidence. In typical cases, a parallelism of better than 0.5 arcsecond is sufficient, although actual tolerances will vary by application. Furthermore, in certain cases, the optical path of a beam 150 through the etalon 100 may not be a straight line. For example, the optical beam 150 can be refracted through an angle at an internal interface in the etalon 100, or the optical path can be folded to form a more compact device by using mirrors, prisms or similar devices. In these cases, the front and back reflective interfaces 112 and 114 may not be physically plane-parallel but they will still be optically plane-parallel. That is, the interfaces 112 and 114 would be physically plane-parallel if the optical path were unfolded into a straight line.

The back reflective interface 114 includes a back dielectric reflective coating 130. The coating 130 has a reflectivity that is substantially 100%. A reflectivity somewhere in the range of 90–100% is typical, although the actual reflectivity will vary by application. If the reflectivity of back coating 130 is less than 100%, light that is transmitted by the back dielectric coating 130 can be used to monitor the etalon 100. In applications where higher loss can be tolerated or the optical beam exits at least partially through the back surface 114, the reflectivity of back coating 130 can be significantly less than 100%.

Similarly, the front reflective interface 112 shown in both FIGS. 2A–2B includes a front dielectric reflective coating 120. The front reflective coating 120 is designed so that the etalon has the desired dispersion response, as will be further described below. In some implementations, the front reflective coating is a multilayer dielectric coating designed using conventional techniques. In alternate embodiments, the front reflective coating 120 is a single layer design. In some implementations, there is no front reflective coating 120. The interface 112 is simply the interface between the uncoated body 110 and the surrounding material. That is, it is the atmosphere—material 113 interface in FIG. 2A or the front coating substrate 102—air space 110 interface in FIG. 2B.

With respect to reflectivity, the etalon 100 functions as follows. An optical beam 150 is incident upon the front reflective interface 112 of the etalon 100 at a substantially normal angle of incidence. The reflectivity of the etalon interfaces 112 and 114 results in multiple beams, which interfere, thus producing etalon behavior. If the incoming optical beam is perfectly normal to the etalon's front reflective interface 112 and the two interfaces 112 and 114 are perfectly plane parallel, the output beam will exit the etalon 100 at the same location as the original point of incidence and will be collinear with the incoming beam 150, but propagating in the opposite direction. The incoming and outgoing beams can be spatially separated by introducing a slight tilt to the beam 150.

The dispersion D introduced by an etalon 100 can be calculated using conventional principles. In particular, the phase modulation $\phi$ introduced by etalon 100 is given by $$\phi = 2\tan^{-1}\left(\frac{r\sin(\omega T + \delta)}{1 + r\cos(\omega T + \delta)}\right) \quad (1)$$

where $r^2 = R$ is the reflectivity of the front reflective interface 112 at the wavelength of interest, $\delta$ is a phase factor caused by the front and back reflective interfaces 112 and 114 (which shall be referred to as the interface phase factor), the back reflective interface 114 is assumed to be 100% reflective, T is the round-trip delay induced by the etalon, and $\omega$ is the frequency of the optical beam 150. Specifically, $T = OPL/c$ where c is the speed of light in vacuum and OPL is the total optical path length for one round trip through the etalon 100. If the one-way optical path through the etalon is a straight line of length L through material of refractive index n, then $OPL = 2nL$. The group delay resulting from Eqn. (1) is $$\tau(\omega) = -\frac{d\phi(\omega)}{d\omega} = -2rT\frac{r + \cos(\omega T + \delta)}{1 + r^2 + 2r\cos(\omega T + \delta)} \quad (2)$$

where $\omega = 2\pi f = 2\pi c/\lambda$, f is the frequency of the optical beam 150 and $\lambda$ is the wavelength. The dispersion D of the etalon is then $$D(\lambda) = \frac{d\tau(\lambda)}{d\lambda} \quad (3)$$

Figure 3A:
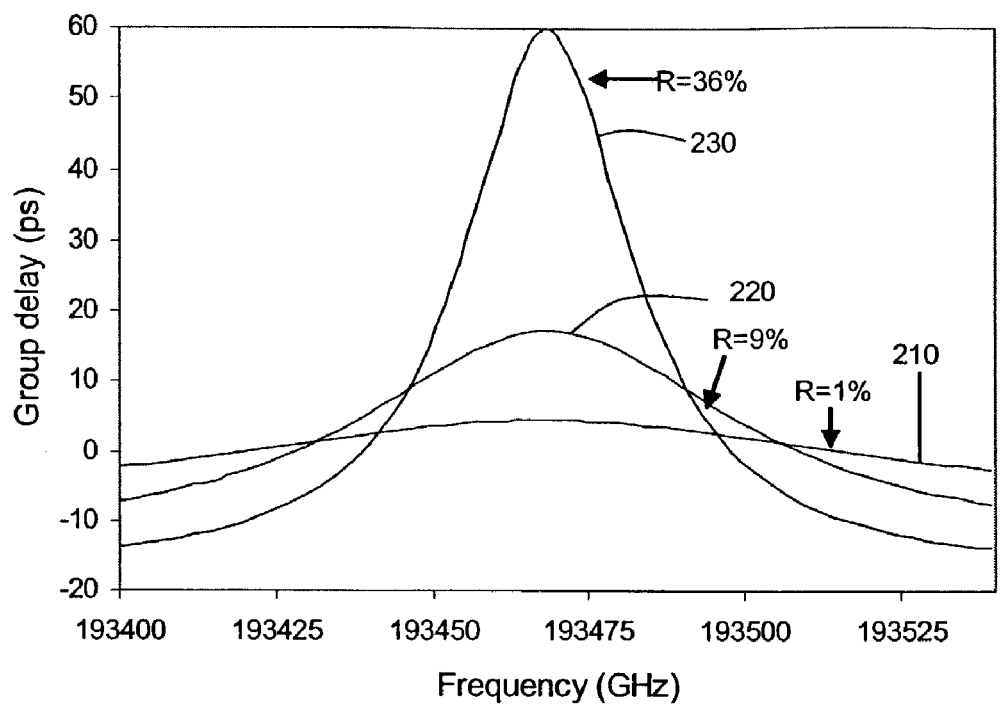
FIG. 3A is a graph of group delay as a function of frequency for different values of reflectivity.

FIG. 3A is a graph of the group delay $\tau(f)$ as a function of frequency f for three different values of the reflectivity $R = r^2$. The curves 210, 220 and 230 correspond to reflectivity values R of 1%, 9% and 36%. The different reflectivities can be realized by varying the design of the front reflective interface 112. For simplicity, OPL is assumed to be constant for these curves and the reflectivity is assumed to be constant with wavelength.

Figure 3B:
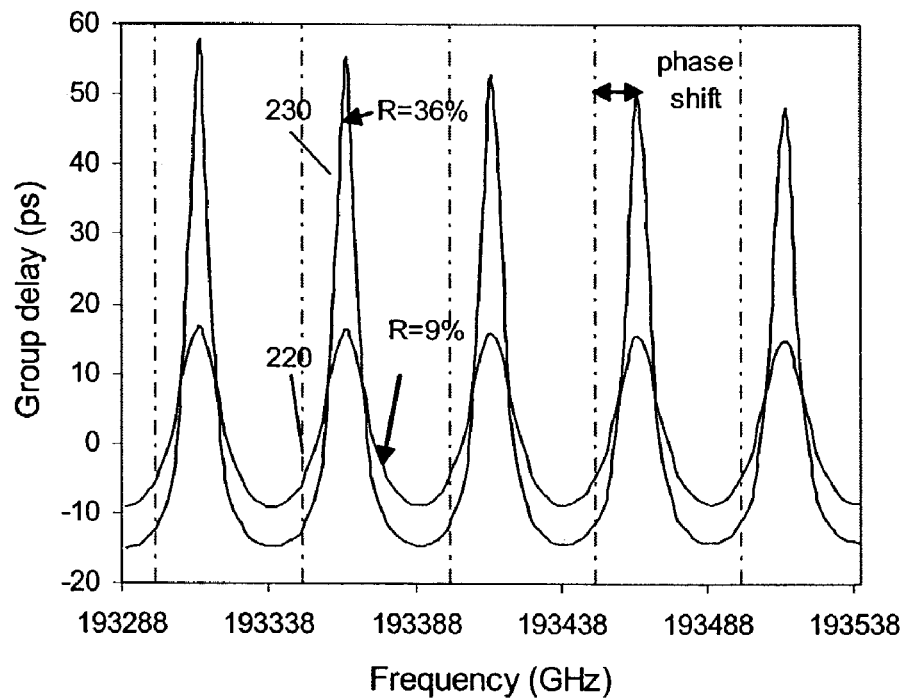
FIG. 3B is a graph of group delay as a function of frequency illustrating the quasi-periodic nature of the group delay function.

When the reflectivity is independent of wavelength, the group delay $\tau(f)$ and dispersion D are periodic functions of the frequency f. The base period of these functions is called the free spectral range (FSR). The FSR depends on optical path length with $FSR = c/OPL$, where c is the light speed at vacuum. Thus tuning OPL results the change of FSR. When the reflectivity varies slowly with wavelength, the group delay τ(f) is not exactly periodic but is still close to periodic (i.e., quasi-periodic). FIG. 3B is a graph of a quasi-periodic group delay for an etalon with wavelength-dependent reflectivity. The spacing of the maximums in the group delay function is almost exactly equal to the free spectral range of the etalon. There is a slight variation due to the wavelength dependence. The magnitude of the maximum varies from one "period" to the next as a result of the wavelength dependent reflectivity. The basic periodicity of the maxima (or minima) can be adjusted by varying OPL.

The location of the maxima and minima in FIG. 3B can be shifted to the left or right by varying the phase factor δ caused by the interfaces and/or by varying the OPL (or, equivalently, the FSR). The phase factor δ is a result of the design of the front and back reflective interfaces 112, 114 and is relatively difficult to change once fabricated. On the other hand, many methods are available to tune the OPL, including the approaches described in the context of FIGS. 2A–2B.

Figure 3C:
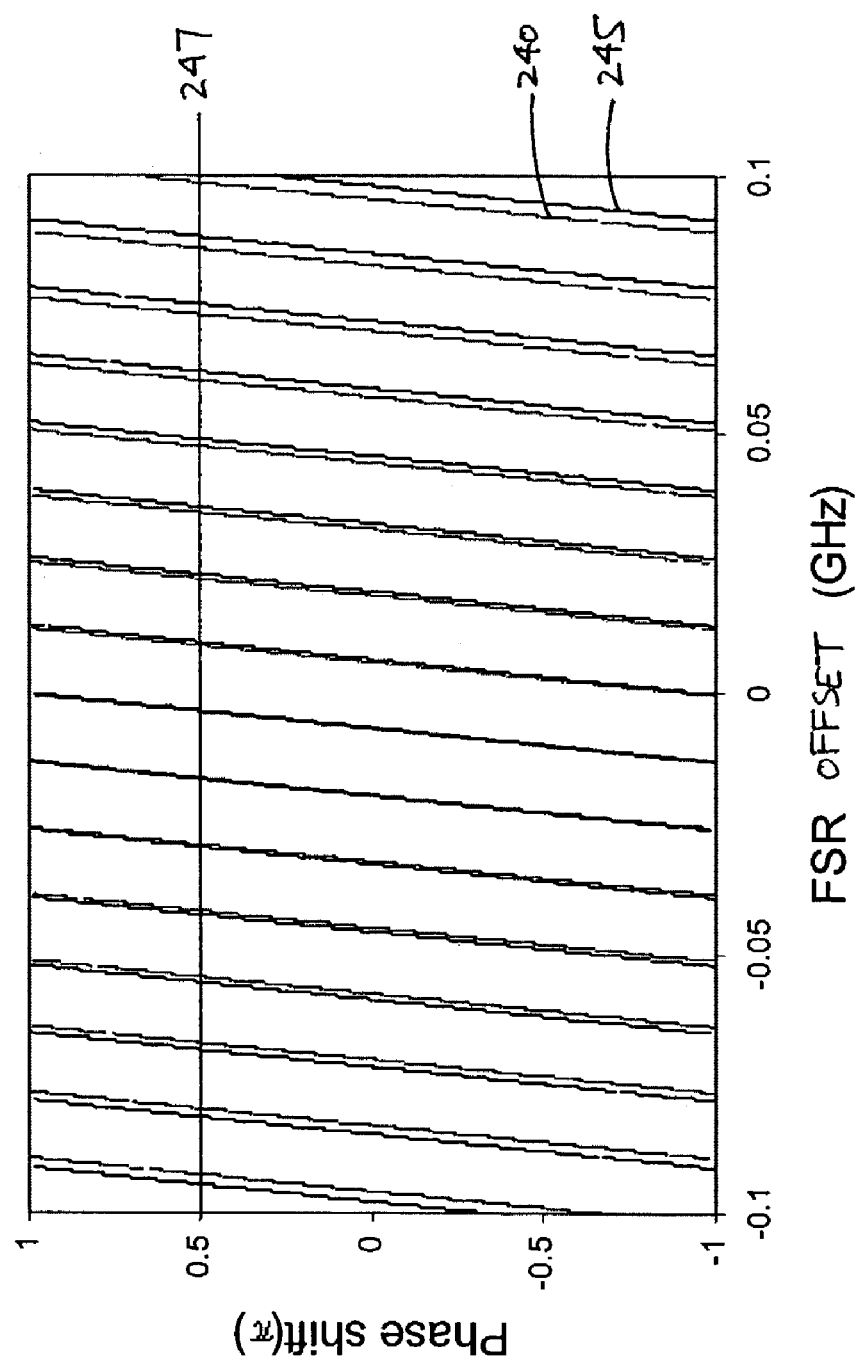
FIG. 3C is a graph of phase offset as a function of FSR offset.
Figure 3D:
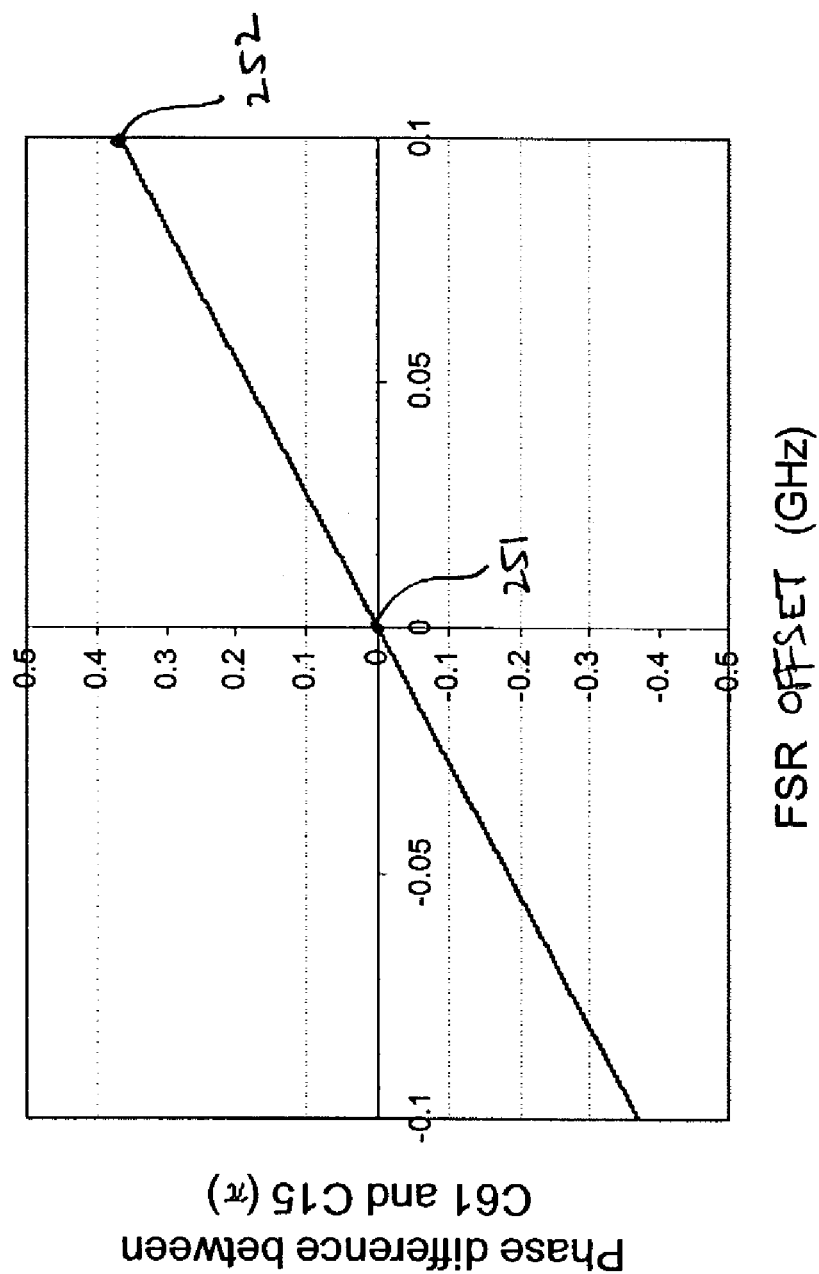
FIG. 3D is a graph of difference in phase offset between two wavelengths as a function of FSR offset.

The vertical lines in FIG. 3B indicate the wavelengths specified in the ITU grid, as defined in the ITU standards. If the OPL is choosen so that the FSR of the etalon is exactly matched to the ITU wave band spacing and δ=0, then the maxima of the group delay curve will fall halfway between the vertical lines. That is, the maxima of the group delay curve will have a π phase shift relative to the ITU grid. The phase shift relative to the ITU grid (or other reference) will sometimes be referred to as the phase offset p. When the OPL of the etalon is changed, and the FSR of the etalon does not match the ITU spacing, the FSR offset (the difference between the FSR and the ITU grid channel spacing) will introduce a corresponding phase offset. The phase offset depends in part on wavelength. FIG. 3C graphs the phase shift relative to the ITU grid (i.e., the phase offset) as a function of FSR offset. Curve 240 corresponds to a wavelength of λ=1528.773 nm and curve 245 to a wavelength of λ=1565.496 nm, respectively. These two wavelengths represent the two ends of the C-Band. When the FSR offset is zero, both wavelengths experience the same phase offset. As the FSR offset increases in magnitude, there is an increasing difference in phase offset between the two wavelengths. FIG. 3D graphs the difference in phase offset as a function of the FSR offset for the two wavelengths shown in FIG. 3C. At an FSR offset of 0.1 GHz (or −0.1 GHz), the difference in phase offset is almost 0.4π.

For an etalon used in a single wavelength application, this phase difference is not relevant. Furthermore, there is a modulo 2π redundancy in the function of FIG. 3C. For example, any of the intersections with line 247 will result in a phase offset of 0.5π. As a result, if the OPL of the etalon can be tuned over a range that results in a 2π range for the phase offset, the group delay curves shown in FIG. 3B can be shifted to any point relative to the ITU grid. In the example of FIG. 3C, an FSR range of approximately ±0.0065 GHz will result in a 2π range for the phase offset. This range is small enough that it can be realized by thermal tuning (i.e., tuning the OPL by changing the temperature of the etalon).

As the wavelength range for the application expands, the difference in phase offset becomes more significant. One way to minimize this difference is to operate the etalon in a vicinity of zero FSR offset. At this point, the periodicity of the etalon matches the periodicity of the ITU grid.

Alternately, the phase difference can be used intentionally to compensate for different amounts of chromatic dispersion at different wavelengths. For example, continuing the C-band example, the phase offset at the center wavelength channel can be continuously changed by tuning the OPL (or equivalently the FSR). As mentioned above, an FSR tuning range of approximately ±0.0065 GHz will result in a 2π range for the phase offset. However, this ±0.0065 GHz range can be centered at an FSR offset of 0±0.0065 GHz (point 251 in FIG. 3D), an FSR offset of 0.10±0.0065 GHz (point 252), or some other FSR offset. At point 251, the extreme wavelength channels will have a phase offset that roughly matches the center wavelength channel, so there will be little wavelength variation in the dispersion compensation. However, at point 252, the extreme wavelength channels will be shifted by approximately +0.2π and −0.2π relative to the center wavelength channel. This effect can be used for dispersion slope compensation or to compensate for other types of dispersion that vary with wavelength.

The design and selection of materials for etalon 100 depends on the wavelength(s) λ of the optical beam 150, as well as considerations such as the end application, manufacturability, reliability and cost. Current fiber optic communications systems typically use wavelengths in either the 1.3 μm or 1.55 μm ranges and etalons intended for these systems would use corresponding materials. Obviously, the term "transparent body 110" means transparent at the wavelength of interest.

In one example, the etalon 100 is designed for use in the 1.55 μm wavelength range. The incoming optical beam 150 has a center wavelength (or multiple center wavelengths if the optical beam is wavelength division multiplexed) that is consistent with the ITU grid, as defined in the ITU standards. The optical path length of body 110 is selected so that the free spectral range of the etalon 100 is matched to the basic periodicity of the ITU grid. For example, the ITU grid defines wave bands which are spaced at 100 GHz intervals. In one application, a fiber optic system implements one data channel per wave band at a channel spacing of 100 GHz, and the free spectral range of the etalon 100 is also approximately 100 GHz, thus matching the ITU grid and the spacing of the wavelength channels. In another application, two data channels are implemented in each wave band. The spacing between channels is 50 GHz, or half the band to band spacing on the ITU grid. The etalon 100 is designed to have a free spectral range of approximately 50 GHz, thus matching the channel spacing of the wavelength channels. The slight difference between FSR and channel spacing is used to tune the etalon response.

Continuing this example, the front and back reflective interfaces 112 and 114 of the etalon 100 are plane-parallel to within 0.5 arc seconds and the back reflective coating 130 is a Bragg reflector with enough layers to achieve a reflectivity of over 99%. The front reflective coating 120, if it even exists, typically varies in design from etalon to etalon, depending on the desired reflectivity for the front reflective interface of that etalon. In one embodiment, the front reflective interface 112 has a relatively flat response as a function of wavelength. Alternately, the reflectivity of the front reflective interface can vary significantly with wavelength. Many coating designs can achieve a desired wavelength dependency by using non-quarter wave thicknesses for different layers.

Referring to FIG. 1, each etalon stage 20 introduces a certain group delay τ(ω) and corresponding dispersion D(λ). These quantities are additive. The cumulative group delay produced by all of the stages 20 is the sum of the group delays produced by each etalon stage 20. Similarly, the cumulative dispersion produced by all of the stages 20 is the sum of the dispersions produced by each etalon stage 20. By appropriately selecting the group delay introduced by each stage 20, a substantially linear group delay curve and therefore a substantially constant dispersion can be achieved for the overall system over a certain operating bandwidth.

Furthermore, if the free spectral ranges of all the etalon stages are approximately equal, then the group delay curve will also be approximately periodic. Thus, the overall system can be used to substantially compensate for chromatic dispersion over an operating bandwidth within each of a multiplicity of wavelength channels. For example, the wavelength channels may be spaced by 100 GHz and the overall system may substantially compensate for chromatic dispersion over an operating bandwidth of 60 GHz within each wavelength channel for a certain number of channels. For some applications, it is preferable that the overall system be able to compensate for chromatic dispersion over some or all wavelength channels within a communications band, for example the C-band (1528–1565 nm), the L-band (1565–1610 nm) or the S-band (1420–1510 nm).

In many fibers, the chromatic dispersion also varies from channel to channel. For example, the chromatic dispersion may be characterized by a dispersion slope. By correct selection of the interface phase factors and/or free spectral ranges, enough aperiodicity can be introduced into the overall system to compensate for dispersion slope or other channel to channel variations in the chromatic dispersion.

More specifically, suppose that there are a total of m etalon stages, as shown in FIG. 1. Let $\omega=2\pi c/\lambda=2\pi f$, where $\lambda$ is the wavelength in vacuum and f is the frequency. Each individual stage i is characterized by a reflective coefficient $r_i$, interface phase factor $\delta_i$, and round-trip delay $T_i=2n_iL_i/c$ where $n_i$ and $L_i$ are the refractive index and nominal physical length of the body of the etalon (actually, the summation of product nL for all materials in the body). Eqn. (2) can be expressed for the i-th stage as $$\tau_i(\lambda) = -\frac{4r_i n_i L_i}{c} \frac{r_i + \cos\left(\frac{4\pi(n_i L_i + \delta_i)}{\lambda}\right)}{1 + r_i^2 + 2r_i \cos\left(\frac{4\pi(n_i L_i + \delta_i)}{\lambda}\right)} \quad (4)$$

As shown in Eqn. (4), the group delay $\tau_i$ is affected by the reflective coefficient $r_i$, the optical path length $2n_iL_i$ and the interface phase factor $\delta_i$. It is possible to obtain a quasi-linear group delay by superimposing multiple group delay curves with proper phase matching conditions. To illustrate the concept of employing multiple stages to achieve a tunable quasi-linear group delay, the following example uses a four-stage configuration following the architecture in FIG. 1. The same idea can be extended to more or fewer stages in a straightforward manner. Increasing the number of stages reduces group delay ripple but at a cost of higher insertion loss and higher material cost. With enough stages, operating bandwidths which exceed 50% of the free spectral range of the etalons are possible.

The total group delay $\tau_T(\lambda)$ for an m-stage configuration can be expressed as $$\tau_T(\lambda) = \sum_{i=1}^{m} \tau_i(\lambda) \quad (5)$$

Hence, the dispersion D of the multi-stage system is related to the total group delay $\tau_T(\lambda)$ by $$D(\lambda) = \frac{d\tau_T(\lambda)}{d\lambda} \quad (6)$$

Generally, better performance can be achieved by adding more degrees of freedom, although there is a point of diminishing returns. Better performance typically means larger dispersion tuning range, less residual dispersion and/or ripple (i.e., better dispersion compensation) and/or a wider operating bandwidth. More degrees of freedom typically means more stages 20 and/or possibly more variability in the reflective coefficient, interface phase factor and/or the optical path length. With enough variability, a system 10 can be tuned to compensate for different amounts of chromatic dispersion within a wavelength channel and/or different amounts and types of channel-to-channel variation in the chromatic dispersion.

In other approaches, the reflective coefficients are tuned in order to compensate for different dispersion values. However, tuning the reflective coefficients usually requires a moving part. As a result, for certain applications, non-tunable reflectivities may be preferred in order to make the device more compact or robust. However, dispersion compensation systems with fixed reflective coefficients (and only tunable OPL) usually do not perform as well at all dispersion values in terms of group delay ripple. This problem can be addressed by using extra etalons. In addition, the fixed reflective coefficients are carefully chosen to optimize the etalon performance at both low dispersion values and high dispersion values. In one approach, two of the etalons have similar reflective coefficients.

Figure 4A:
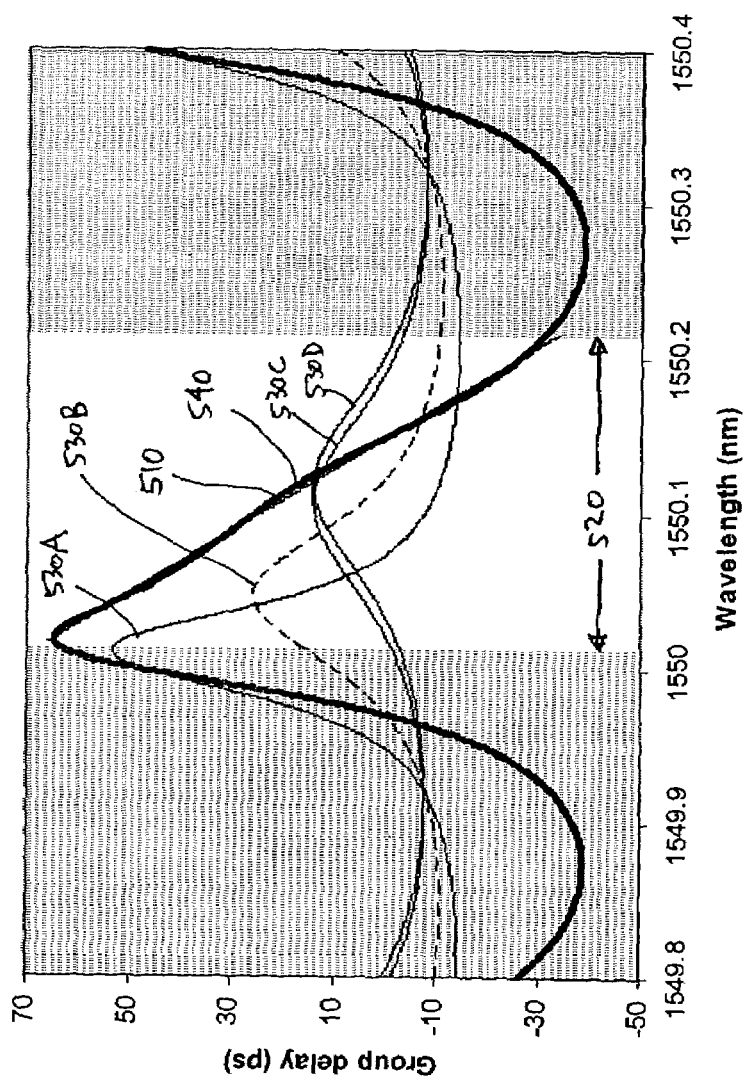
FIGS. 4A–4B are graphs of group delay as a function of wavelength for a four-etalon dispersion compensation system.
Figure 4B:
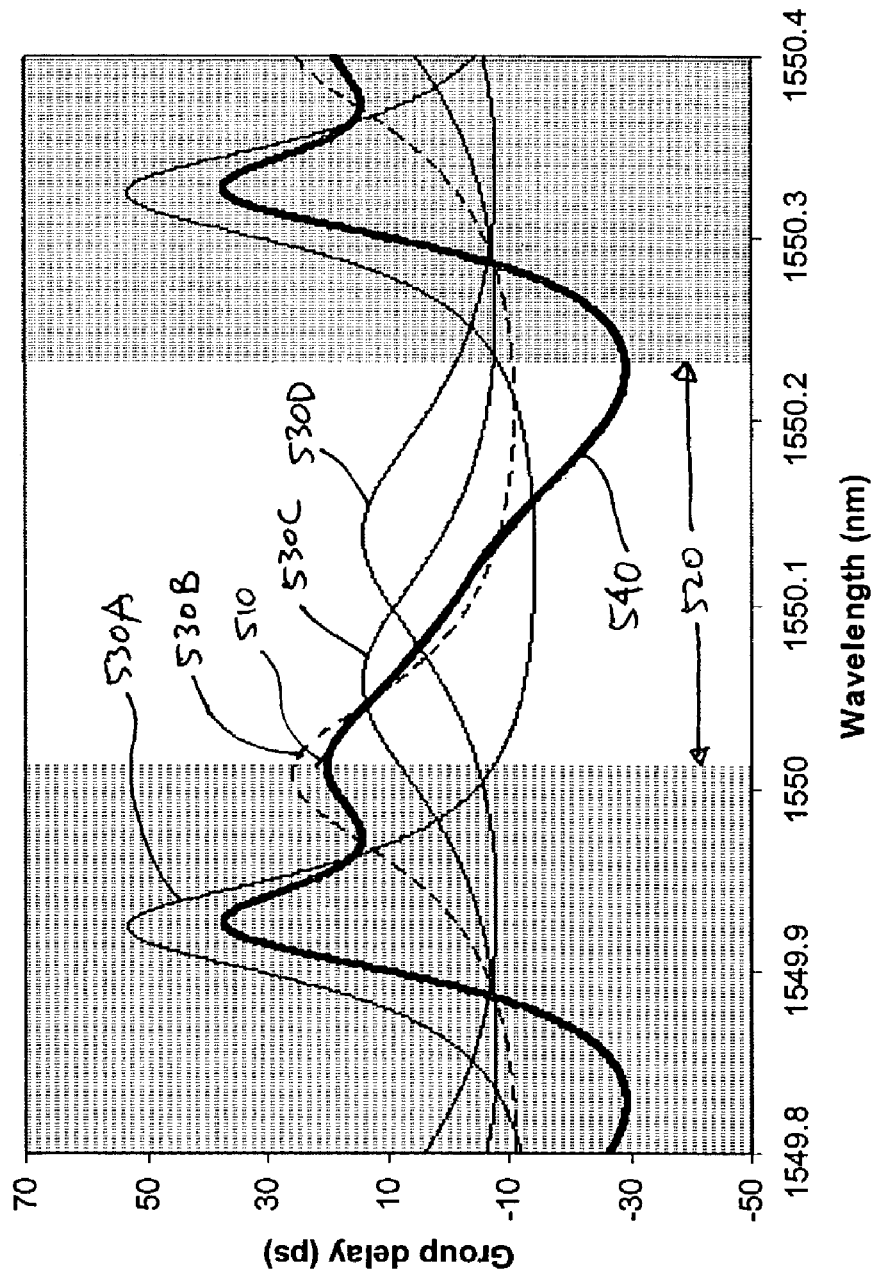

FIGS. 4A–4B are graphs of group delay as a function of wavelength for a four-etalon dispersion compensation system. In each figure, the target group delay for the system is straight line 510 and the operating bandwidth is region 520. Curves 530A–530D show the group delay for each of the four stages and curve 540 is the total group delay for the system. FIG. 4A shows the response when the dispersion compensation system is tuned to a dispersion of –500 ps/nm, and FIG. 4B shows the device when it is tuned to a dispersion of –250 ps/nm.

The four etalons have reflectivities R of 33.6%, 15.2%, 6.6% and 6.6%, respectively. Curve 530A, with the highest peak, corresponds to the highest reflectivity of 33.6%. Curve 530B is for the 15.2% reflectivity etalon. Curves 530B and 530C are the two etalons with 6.6% reflectivity. The reflectivities for curves 530C–530D are low enough that they can be implemented by a bare etalon-atmosphere interface with no additional dielectric coating required, reducing costs and increasing reliability and lifetime. Furthermore, those two etalons are identical, reducing the part count and costs even further.

The reflectivities of the etalons are fixed. The different amounts of dispersion compensation are achieved by varying the OPL (or equivalengtly the FSR), which in turn tunes the phase offset of each group delay curve 530A–530D, as evidenced by the shift in the peaks between FIGS. 4A and 4B. In particular, the phase offset $p(\lambda)$ is defined as the position of the peak relative to the ITU grid, measured in radians. It is determined by both the interface phase factor $\delta$ and the phase shift resulting from the FSR offset. In particular, $$p(\lambda) = \pi + \delta - 2\pi \frac{\Delta FSR}{FSR_0 \cdot (FSR_0 + \Delta FSR)} \cdot \frac{c}{\lambda} \quad (7)$$

where the interface phase factor δ is the phase shift caused by front and back reflective interfaces, $FSR_0$ is the free spectral range that exactly matches the channel spacing of the application, and ΔFSR is the FSR offset which is defined as the difference between the actual FSR and $FSR_0$. The phase shift caused by the front and back reflective interfaces may also depend on wavelength. For most etalon coatings, the phase shift caused by front and back coatings can be approximated as a linear function of wavelength. The δ in Eqn. (7) is the constant part (offset) of this linear function. The wavelength dependant part of the linear function has a similar form to that caused by the FSR mismatch and has been merged into the quantity ΔFSR for convenience. In the following example, $FSR_0$=50 GHz. When the FSR of the etalon is close to $FSR_0$, small changes in the FSR can produce a 2π change in phase offset without introducing a significant difference in the phase offset experienced at different wavelengths. This approach can be used for multi-wavelength applications where the dispersion does not vary significantly with wavelength.

Figure 5B:
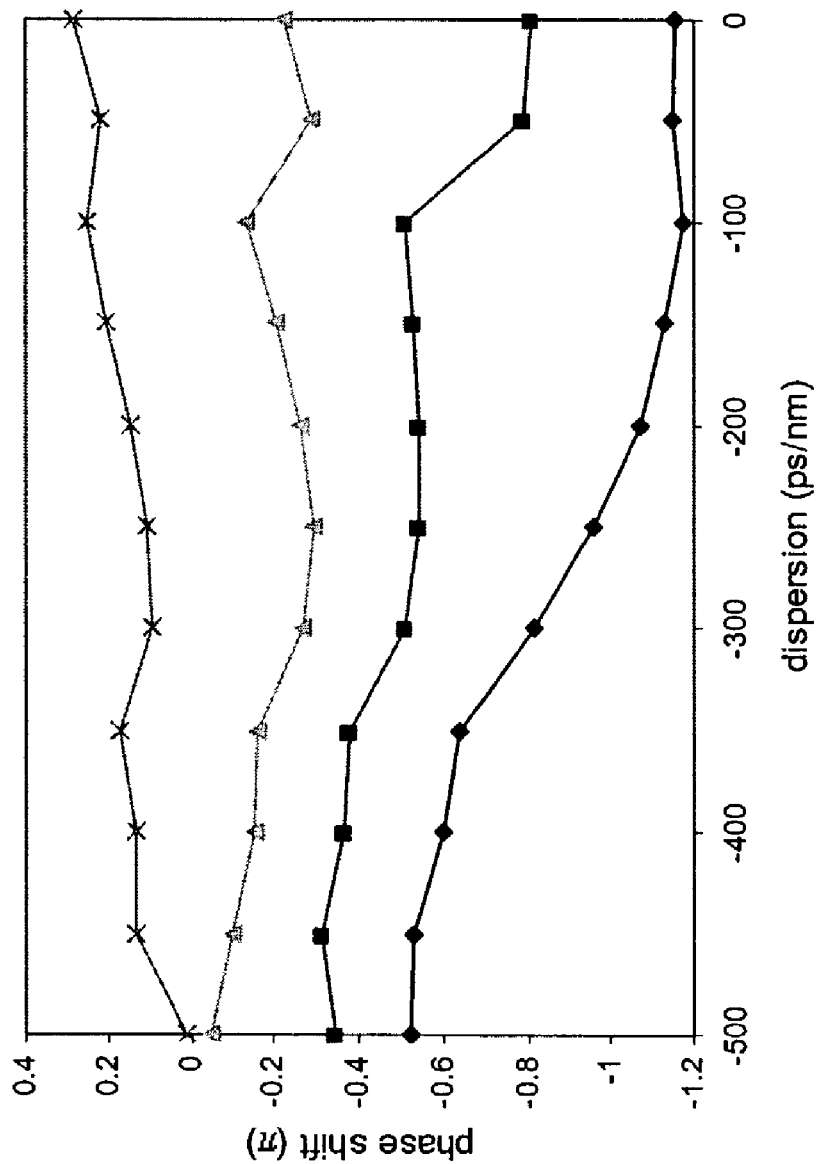
FIG. 5B is a graph of the phase offsets in FIG. 5A.
Figure 5C:
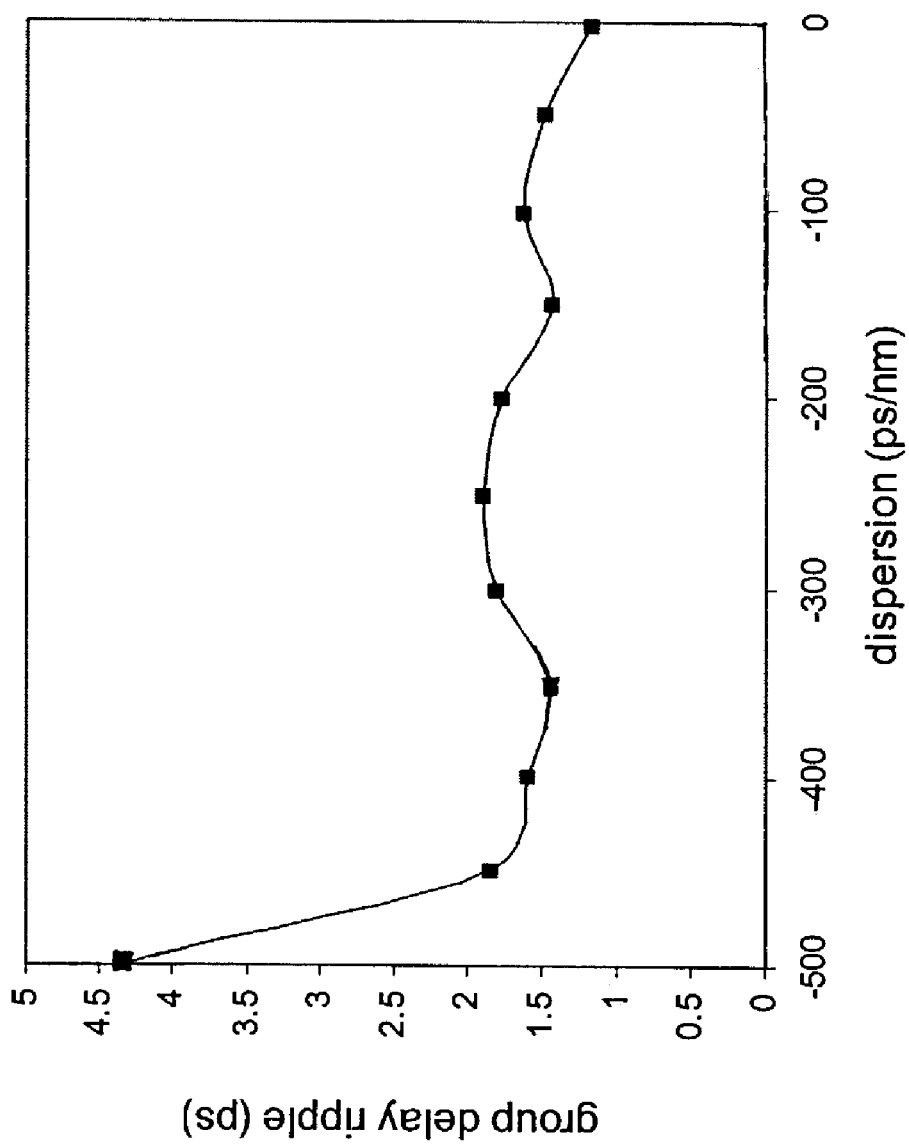
FIG. 5C is a graph of the group delay ripple in FIG. 5A.

By tuning the stages to different values of OPL, not only can the system compensate for a specific chromatic dispersion, it can also be tuned to compensate for different chromatic dispersions. FIGS. 5A–5C illustrate that the four-etalon system can be tuned to compensate for chromatic dispersions ranging from −500 ps/nm to +500 ps/nm.

FIG. 5A is a table listing the phase offsets used to compensate for different chromatic dispersions. The first column is the target dispersion. The four columns $p_i$ are the phase offsets for the four etalons i. Ripple is the peak-to-peak deviation between the target group delay and the actual group delay realized. This table illustrates the flexibility of this system. The same device can be tuned to compensate for dispersions ranging from −500 to +500 ps/nm. The parameters for positive dispersion are not listed in FIG. 5A but can be obtained by changing the sign of $p_i$ in FIG. 5A, with similar performance. FIG. 5B graphs the phase offsets $p_i$ as a function of dispersion, for each of the four etalons. FIG. 5C graphs the Ripple as a function of dispersion.

If the FSRs are chosen to be approximately equal to $FSR_0$, the group delays and dispersions will be approximately periodic and the system can compensate for chromatic dispersion on either a per-channel or multi-channel basis. In other words, if the dispersion compensation system is used in an application with a predefined and periodic spacing of wavelength bands (e.g., the 50 GHz or 100 GHz spacing of the ITU grid), then the etalons can be designed to have a free spectral range that is approximately equal to the periodic spacing. In this way, the dispersion compensation system can be used over multiple wavelength channels, if each wavelength channel experiences roughly the same chromatic dispersion.

However, optical fiber can have different dispersion at different wavelengths. One measure of this is dispersion slope. The dispersion of an optical fiber usually has a linear relationship with wavelength:

$$D(\lambda) = D_0 + S(\lambda - \lambda_0) \quad (8)$$

where $\lambda_0$ is the reference wavelength, $D_0$ is the dispersion at the reference wavelength (i.e., the dispersion offset) and S is the dispersion slope.

In order to account for dispersion slope, the phase offsets typically must vary as a function of wavelength. This can be achieved by using different values of FSR offset. In other words, the FSR of the etalon is chosen to be slightly different from the channel spacing, typically within 5% of the channel spacing. For example, if the channel spacing is 50 GHz, the FSR of the etalon might be chosen to be somewhere from 49.5 GHz–50.5 GHz, in order to compensate for dispersion slope values. The phase offset that results from an FSR offset can be expressed as $$p(\lambda) = \pi + \delta - 2\pi \frac{\Delta FSR}{FSR_0 \cdot (FSR_0 + \Delta FSR)} \cdot \frac{c}{\lambda_0 + \Delta\lambda} \quad (9)$$

where $\lambda_0$ is the nominal center wavelength (of the C-band in this example, approximately 1550 nm) and Δλ is the wavelength offset relative to the center wavelength. Since Δλ for the C-band region is much smaller than the center wavelength $\lambda_0$, Eqn. 9 can be approximated as $$p(\lambda) = \pi + \delta - 2\pi \frac{\Delta FSR}{FSR_0 \cdot (FSR_0 + \Delta FSR)} \cdot \frac{c}{\lambda_0}\left(1 - \frac{\Delta\lambda}{\lambda_0}\right) \quad (10)$$

Eqn. 10 indicates that the phase offset resulting from the FSR offset is a linear function of wavelength. The slope of the linear function is determined by ΔFSR. The dispersion to be compensated at wavelength λ is shown in Eqn. 8. Combining Eqns. 8 and 10 yields the relationship between phase shift and dispersion:

$$p(D) = \pi + \delta - 2\pi \frac{\Delta FSR}{FSR_0 \cdot (FSR_0 + \Delta FSR)} \cdot \frac{c}{\lambda_0}\left[1 - \frac{(D - D_0)}{S \cdot \lambda_0}\right] \quad (11)$$

Eqn. 11 indicates that the optimized phase offsets at single wavelength $\lambda_0$ shown in FIGS. 5A–5B should have a linear relationship with dispersion if the fiber dispersion has a linear relationship with wavelength. However, in reality, this is usually not the case. The present invention shows that only with certain reflective coefficients r, we can get this linear optimized results. The optimal values of the coefficients r depend on channel spacing, channel bandwidth, maximum dispersion slope, maximum dispersion offset and ripple tolerance. For a four etalon dispersion compensation device used in a 10 Gbps system (channel spacing 50 GHz, bandwidth 25 GHz, maximum dispersion −500 ps/nm), two possible solutions are as follows. The first solution has two different reflective coefficients $r_1 = r_2 = 0.45$ and $r_3 = r_4 = 0.35$. The second solution has three different reflective coefficients $r_1 = 0.57$, $r_2 = 0.39$ and $r_3 = r_4 = 0.257$. Both solution give linear dispersion response. The second solution has less group delay ripple.

The reflective coefficient r can be determined using standard optimization techniques. To a first order, the optimization problem is, given an operating bandwidth and a target dispersion slope and dispersion offset, find the constant parameters ($r_i$, $\delta_i$) and tunable parameters ($OPL_i$) which minimize some error metric between the actual dispersion realized and the target dispersion or, equivalently, between the actual group delay realized and the target group delay. Examples of error metrics include the peak-to-peak deviation, maximum deviation, mean squared deviation, and root mean squared deviation. The calculation typically accounts for all channels within the operating bandwidth. For a four-etalon system operating in the C-band, there are 12 parameters ($OPL_i$, $r_i$, $\delta_i$ for each etalon) to be optimized for more than 100 channels.

Figure 6A:
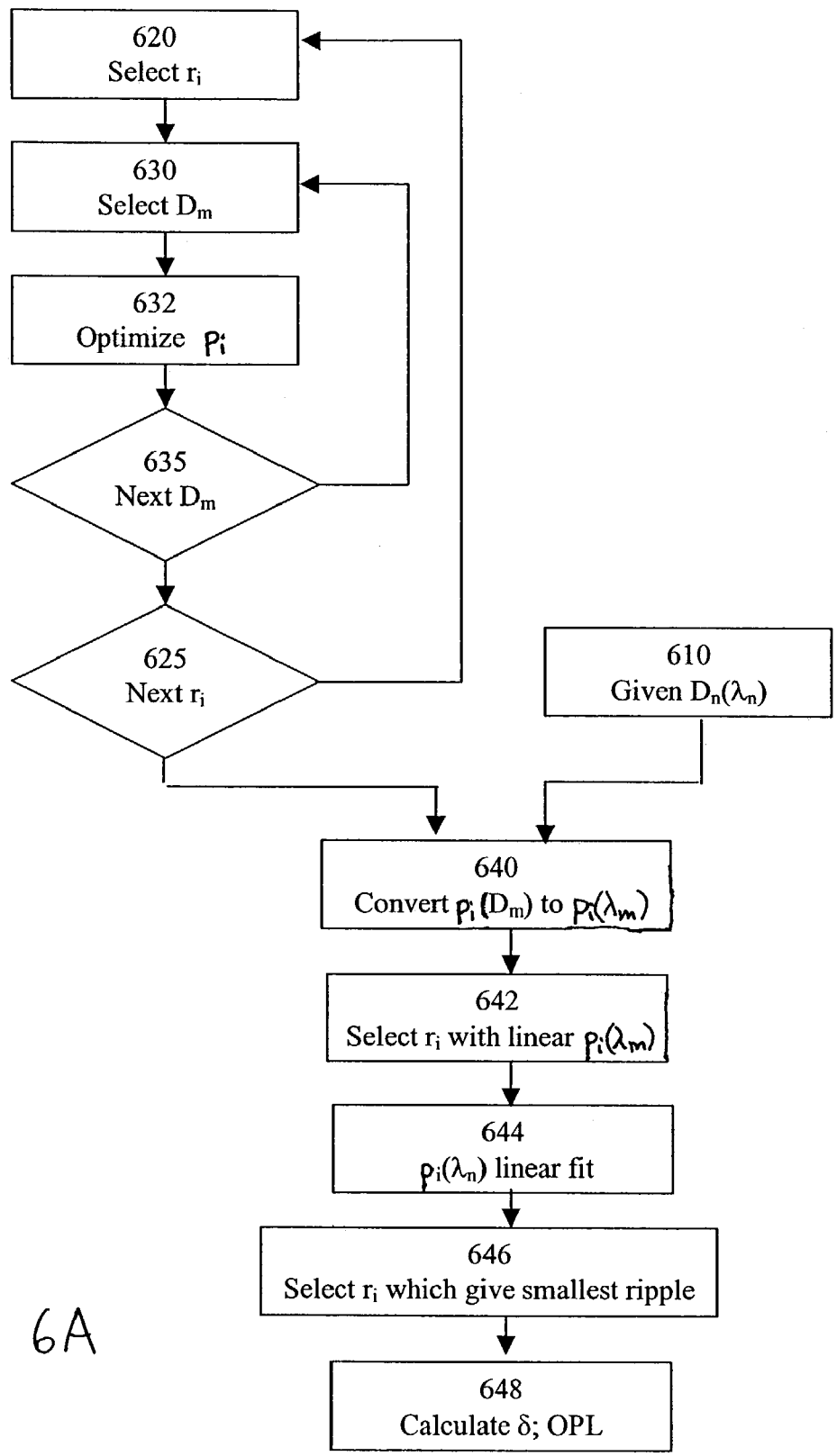
FIG. 6A is a flow diagram illustrating a method for selecting the OPLs for etalons in a dispersion compensation system.
Figure 6B:
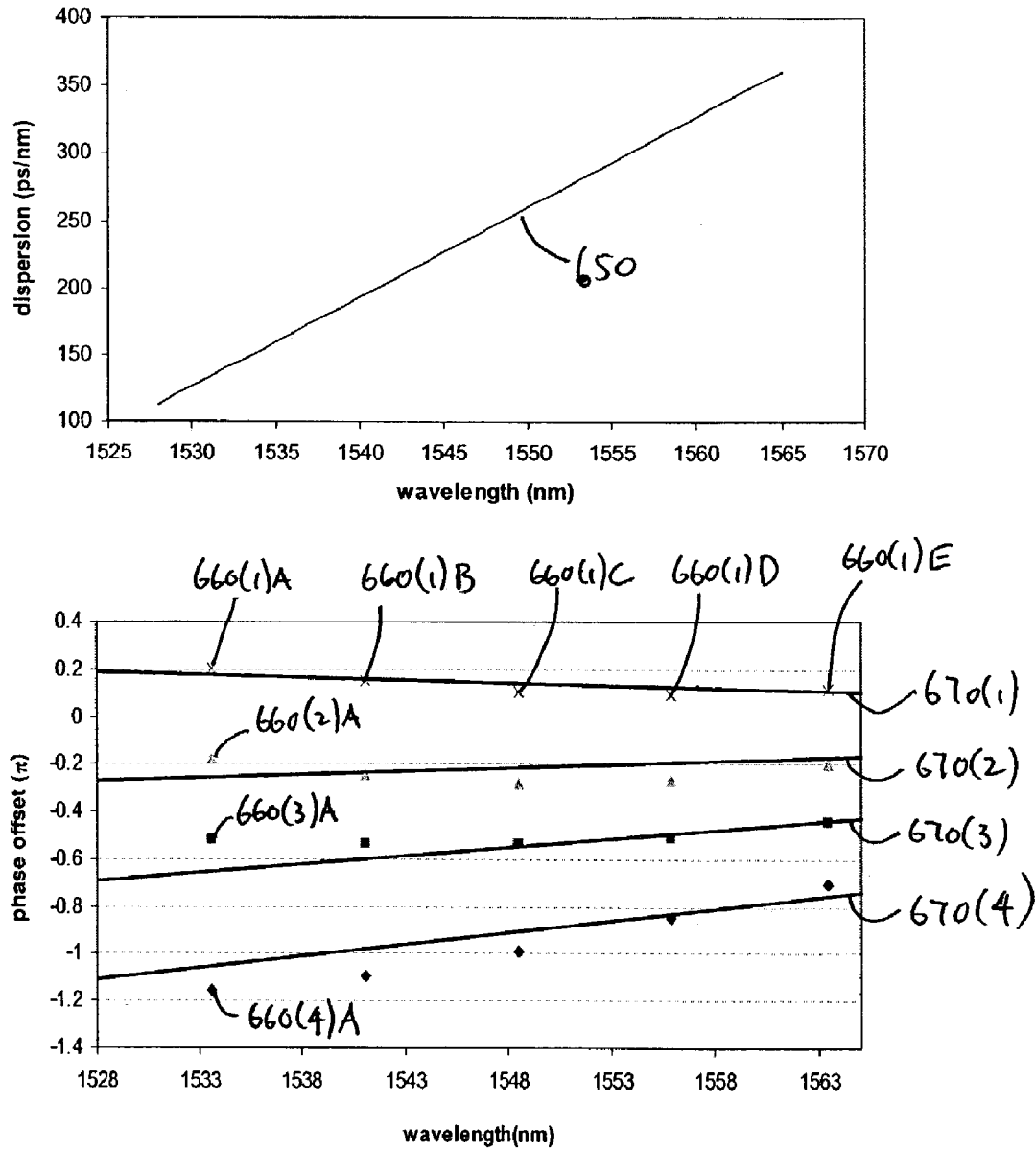
FIG. 6B is a set of graphs illustrating the flow diagram in FIG. 6A.

To speed up the optimization process, the approach shown in FIGS. 6A–6B can be used. This example assumes that a four-etalon system is being designed to implement the dispersion function shown in graph 650. Mathematically, the design problem is, given the dispersion function $D_n(\lambda_n)$ where $\lambda_n$ are the wavelengths of the N different channels to be compensated and $D_n(\lambda_n)$ is the dispersion at each of those channels, find ($OPL_i$, $r_i$, $\delta_i$) for each of the i etalons that minimizes some error metric between the actual dispersion realized and the target dispersion. In this optimization, the dispersion function $D_n(\lambda_n)$ is not treated as a continuous function. Rather, the optimization is performed over the N samples $D_1$–$D_N$ at the wavelengths $\lambda_1$–$\lambda_N$, which in this case are defined by the 50 GHz channels in the C band. If the dispersion function is linear (e.g., described by a dispersion offset and a dispersion slope), then the dispersion function $D_n(\lambda_n)$ is linear with wavelength. Nonlinear dispersion functions can also be handled.

Referring to FIG. 6A, once the dispersion function is defined 610, the method proceeds as follows. There are two loops 620 and 630 that perform the bulk of the optimization. In these loops, the FSR mismatch $\Delta FSR$ is assumed to be equal to zero. The outer loop 620 cycles through different combinations of the reflective coefficients $r_i$. In the approach shown in FIG. 6A, this is achieved by exhaustive search. A grid covering the entire parameter space for $r_i$ is defined and explored in a systematic fashion. In step 620, one set of reflective coefficients $r_i$ from the grid is selected 620 and, after the inner loop 630 is completed, the method steps 625 to the next set of reflective coefficients $r_i$. Other optimization approaches can also be used, for example simulated annealing or gradient based algorithms.

The inner loop 630 optimizes the phase offsets $p_i$ for the etalons, given the values of $r_i$ selected in the outer loop. More specifically, the inner loop 630 cycles through M different dispersion value $D_1$–$D_M$. The number of samples M may or may not equal the number of channels N. At each dispersion value $D_m$ the phase offsets $p_i$ for the etalons are optimized 632 to minimize group delay ripple. Examples of optimization techniques include the multidimensional downhill simplex method and exhaustive search. Exhaustive search is feasible since there is a limited degree of freedom (only $p_i$ for the etalons). The optimization loops 620 and 630 do not depend on the specific fiber dispersion function $D_n(\lambda_n)$ to be compensated for. Rather, the loops are calculated only at the reference wavelength $\lambda_0$ and the results can be used for many different dispersion functions $D_n(\lambda_n)$. Therefore, the loops can be calculated before hand. After loop 630 cycles through all of the dispersion value $D_1$–$D_M$, the result will be phase offset functions $p_i(D_m)$, one for each etalon The outer loop 620 will produce one set of phase offset functions $p_i(D_m)$ for each set of values $r_i$.

In step 640, each of the phase offset functions $p_i(D_m)$ is converted from a function of dispersion into a function of wavelength. This can be done because the target dispersion function $D_n(\lambda_n)$ establishes the correspondence between dispersion and wavelength so that for each dispersion $D_m$, a corresponding wavelength $\lambda_m$ can be determined. The symbols 660(1)A–E to 660(4)A–E depict the samples $p_i(\lambda_m)$ for a set of four etalons. The symbols 660(1)A–E are the samples for etalon 1, at five different wavelengths. The symbols 660(2)A–E are for etalon 2, at five wavelengths, symbols 660(3)A–E for etalon 3 and symbols 660(4)A–E for etalon 4. These phase offset functions $p_i(\lambda_m)$ will realize the target dispersion $D_n(\lambda_n)$ but they may not be physically realizable.

Eqn. 10 shows that only linear phase offset functions $p_i(\lambda_n)$ can be realized. Therefore, step 642 selects the set of reflective coefficients $r_i$ (or a number of candidate sets) that yields the most linear set of phase offset functions $p_i(\lambda_n)$. In FIG. 6B, the lines 670(1)–670(4) are linear functions that approximate the nonlinear phase functions 660(1)–660(4). This produces a more accurate dispersion distribution across the wavelengths. In addition to the dispersion distribution, the group delay ripple is also an important parameter for dispersion compensation devices. Step 644 linearizes the $p_i(\lambda_m)$ from selected solutions from step 642. Step 646 calculates the group delay ripple at different wavelengths and finds the solution which has the least group delay ripple among different channels. The actual values of $FSR_i$ (and $OPL_i$) for each etalon is calculated 648 by comparing Eqn. 10 to the desired phase offset function $p_i(\lambda_n)$. The interface phase factor $\delta_i$ can also be obtained. In particular, the slope of the phase offset function determines $FSR_i$ and an offset determines $\delta_i$.

This approach simplifies the optimization process. For a four-etalon system, the optimization is reduced from a 12-dimensional ($OPL_i$, $r_i$, $\delta_i$) global minimum search problem into two 4-dimensional (one for $r_i$ and one for $p_i$) search problems. In addition, the most time-consuming step (632) is performed at only a single wavelength. It also appears that designs in which two or more etalons have the same reflectivity are generally preferred in order to achieve small ripple at both low dispersion values and high dispersion values. If at least two of the etalons are constrained to have the same or similar reflectivity, this further reduces the complexity of the optimization.

The above approach results in a recipe ($OPL_i$, $r_i$, $\lambda_i$) for each etalon. The parameters $r_i$ and $\delta_i$ are determined by front and back reflective interfaces 112 and 114, and typically are fixed once the etalon is manufactured. However, the actual interface phase factor $\delta_i$ introduced by the reflective interfaces 112 and 114 may not be the target value. Typically, the OPL can be adjusted from its target value to compensate for this difference, but this adjustment can add a small phase shift error across the operating bandwidth. For example, the maximum phase shift error for operation over the entire C-band is less than 1.2% of $2\lambda$. This phase shift error can be further reduced by modifying the method of FIG. 6 to use the actual interface phase factor $\delta_i$.

The example of FIG. 6 designs a four-etalon system to compensate for a single dispersion function. It can be extended to design systems that can compensate for different dispersion functions by tuning the OPLs of the etalons. One way is to add an additional loop between 610 and 648 which cycles through the different dispersion functions. The loops of 620 and 630 do not depend on the fiber dispersion function, and can be calculated once, separately from this additional loop 610, thus saving the calculation time.

Figure 7B:
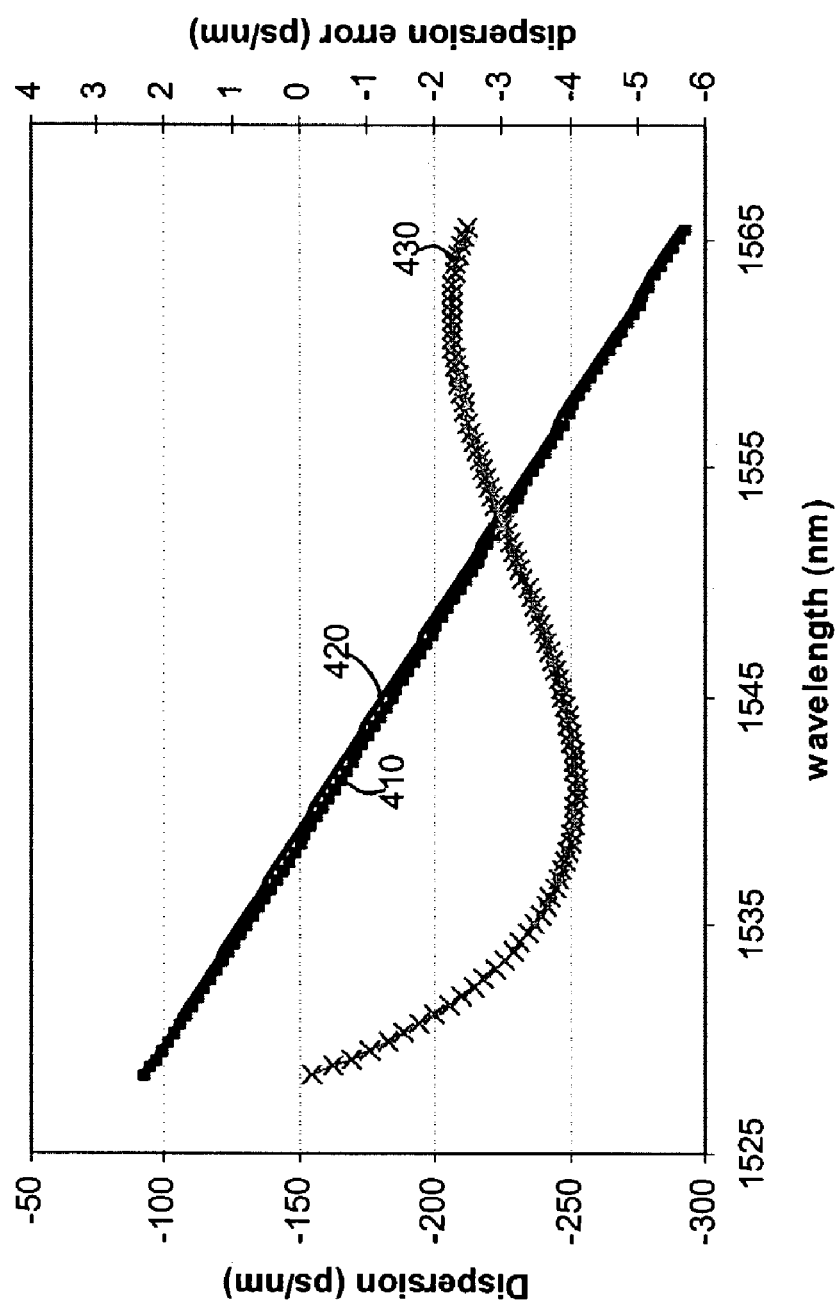
FIGS. 7B–7C are graphs of dispersion and ripple response of the dispersion compensation system of FIG. 7A, when tuned for 80 km of True-wave classic fiber.

FIGS. 7A–7E illustrate an example of this. In this example, a four-etalon dispersion compensation system is designed for a 10 Gbps system using 50 GHz channels across the entire C-band. The first column indicates the type of fiber. The second column shows the dispersion range within the C-band. Note that the fibers have different dispersion offsets and dispersion slopes. The etalons have reflective coefficients of $r_1=0.57$, $r_2=0.39$, $r_3=r_4=0.257$. Each row in FIG. 7A lists $OPL_i$ and $\delta_i$ of each etalon for each type of fiber. Using the same set of four etalons, different dispersion slope and dispersion offset can be compensated by tuning the OPL and interface phase factor δ. In practice, the interface phase factor δ typically is fixed when the front and back reflective interfaces are manufactured. So it typically cannot be tuned to the different values shown. Instead, the OPL is adjusted from its nominal value shown in FIG. 7A in order to compensate for the fixed δ. FIG. 7A illustrates the flexibility of the system. The fiber length in FIG. 7A is 80 km. Other lengths of the fibers can be compensated by the same system by tuning to different values of OPL.

The values of $OPL_i$ for different dispersion values and/or operating bandwidths typically are calculated in advance. They can be stored and recalled when required. In one embodiment, the overall system includes a lookup table that tabulates the parameters $OPL_i$ as a function of dispersion and dispersion slope, or as a function of fiber type and length. When a specific dispersion compensation is required, the corresponding parameters $OPL_i$ are retrieved from the lookup table and the stages are tuned accordingly.

Figure 7C:
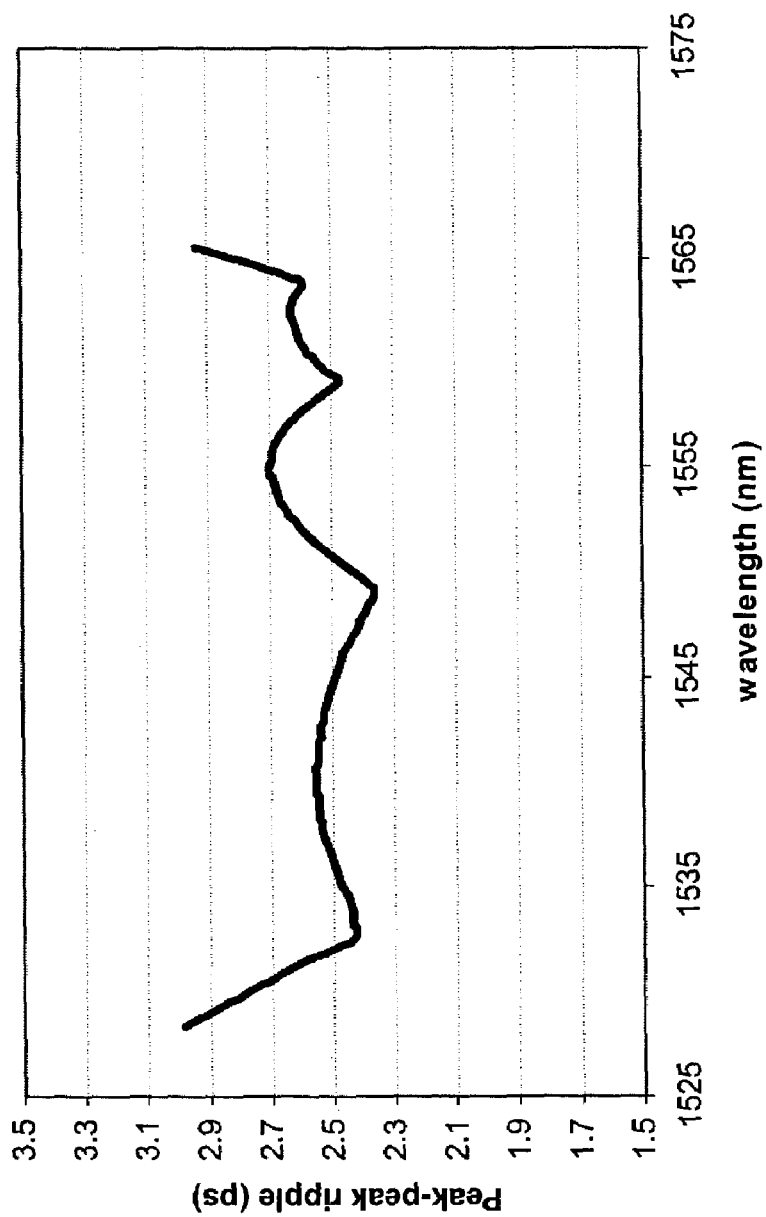
Figure 7D:
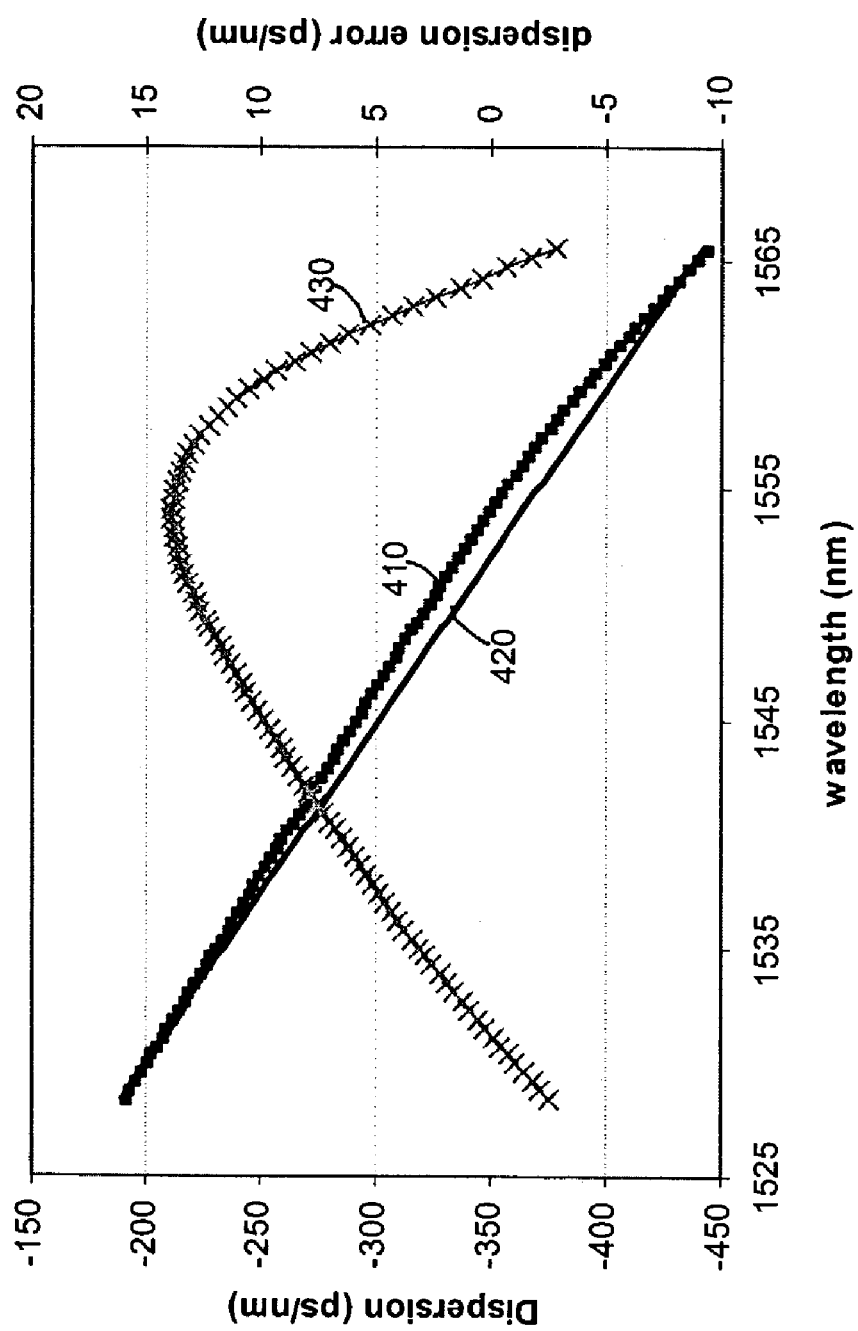
FIGS. 7D–7E are graphs of dispersion and ripple response of the dispersion compensation system of FIG. 7A, when tuned for 80 km of E-LEAF fiber.
Figure 7E:
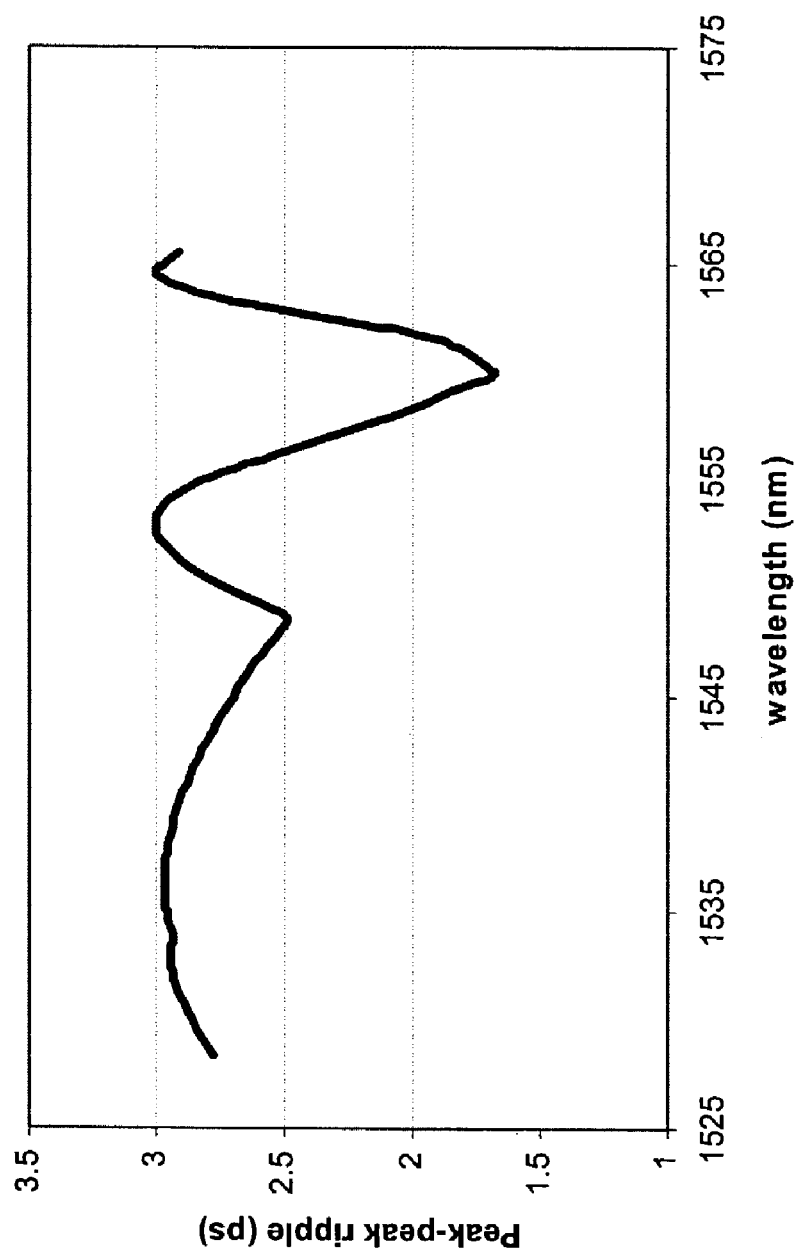

FIGS. 7B–7C illustrate the performance of the system when used to compensate for 80 km of Truewave-classic fiber. FIG. 7B shows the dispersion of this system as a function of wavelength. Curve 410 is the actual chromatic dispersion realized by the four-etalon system. Note that curve 410 is not a continuous curve. Each dot on curve 410 represents the chromatic dispersion value of the four-etalon system within the operating bandwidth for one of the wavelength channels. The complete set of dots represents the chromatic dispersion values for all of the wavelength channels. Curve 420 is the target dispersion. Curve 430 is the dispersion error, which is the difference between curve 410 and curve 420. FIG. 7C shows the group delay ripple at different wavelength channels. The ripple across the C-band is less than 5 ps. FIGS. 7D–7E show similar results for 80 km of E-LEAF fiber. The system performs similarly for all of the fibers listed in FIG. 7A. For all of the fibers, the group delay ripple across the C-band is less than 5 ps.

Note that the design discussed above is not unique. Other solutions are possible. For example, another solution has etalons with reflective coefficients of $r_1=r_2=0.45$ and $r_3$ $r_4=0.35$. Although these two solutions both use reflectivity that does not vary as a function of wavelength, this is not required. Other designs can use wavelength-dependent reflectivities. There can be multiple solutions for a given application and factors in addition to the error metric can be used to select a design. For example, one such factor is the sensitivity of the solution to fluctuations in the parameters. Less sensitive solutions are usually preferred. Another factor is the manufacturability or practicality of the solution. For example, simpler and less costly designs are generally preferred.

Figure 8A:
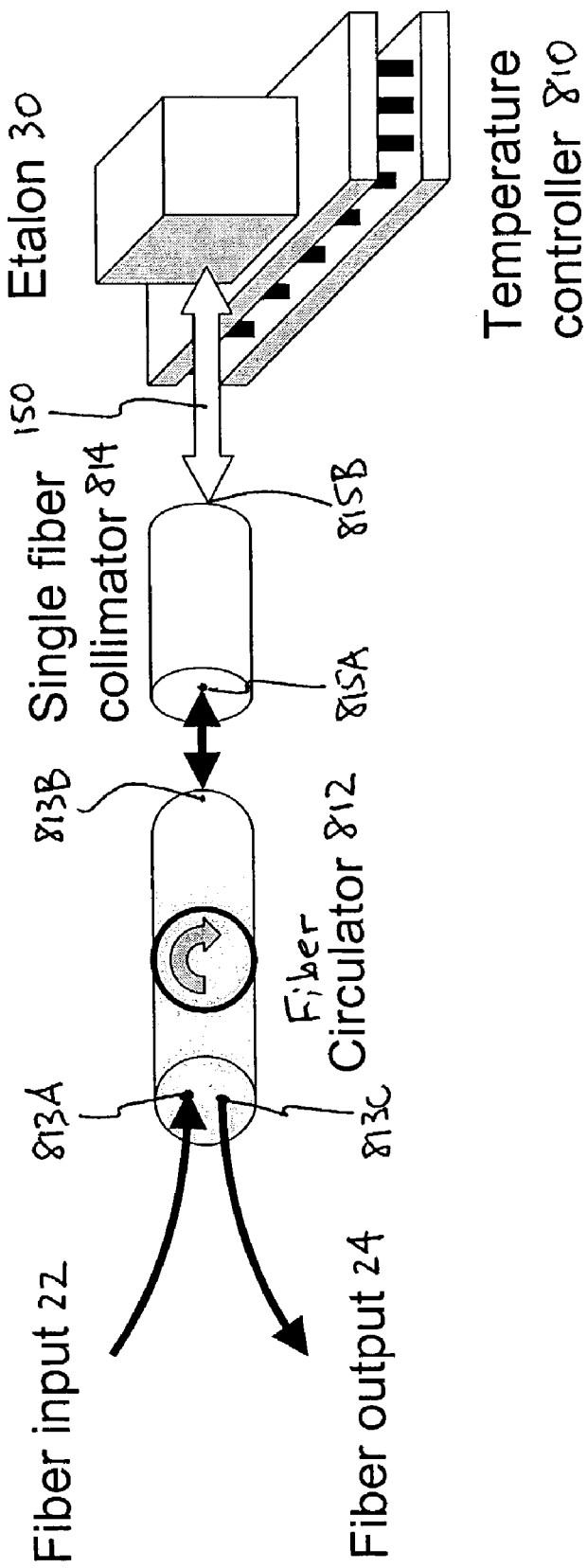
FIGS. 8A, 8B and 8C are perspective views of three different etalon stages.
Figure 8B:
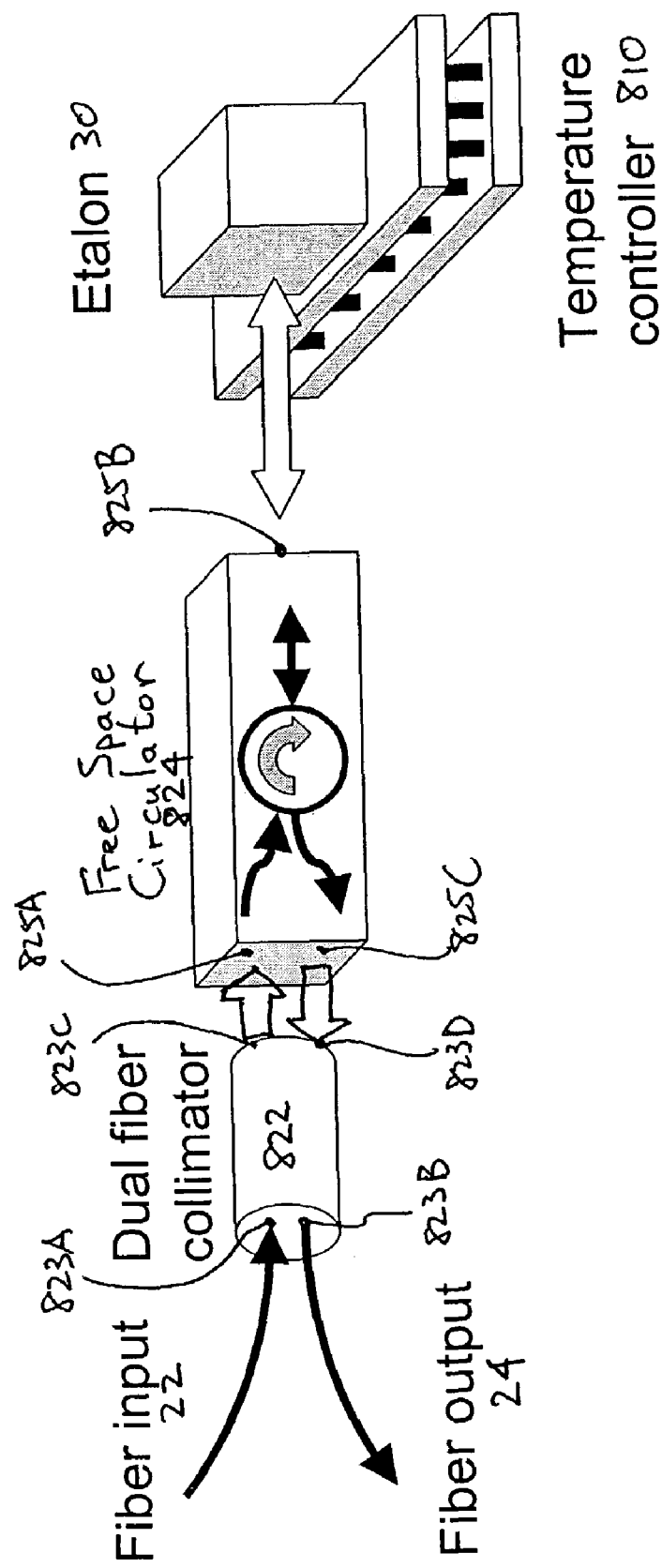
Figure 8C:
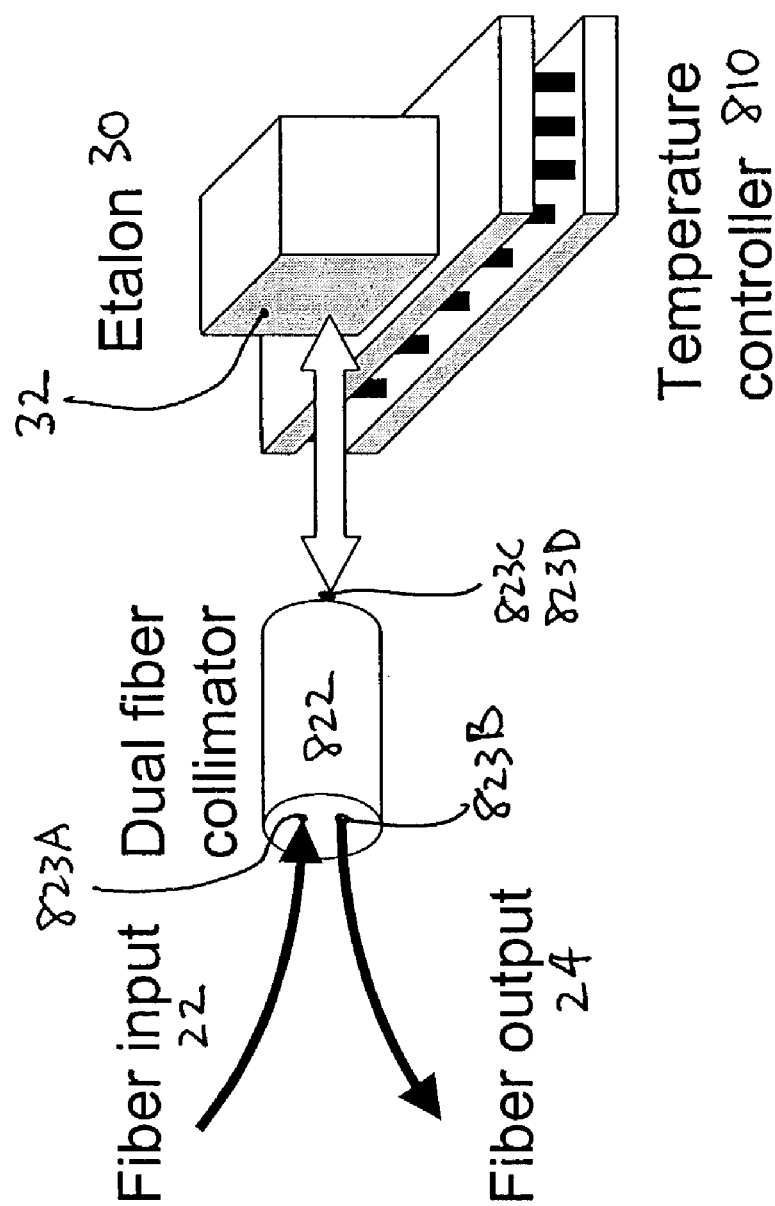

FIGS. 8A–8C are perspective views of three different etalon stages. In these examples, the OPL tunability is implemented by a temperature controller 810, although this is not required. Other methods can be used to tune the etalon's OPL, if required, including those described above. More specifically, the etalon 30 is mounted on a thermoelectric cooler 810. The cooler 810 is in thermal contact with the transparent body of the etalon 30 and controls the temperature of the etalon, which in turn tunes its OPL. Other types of temperature controllers can be used in place of the thermoelectric cooler 810. In some implementations, a more complex thermal design increases the accuracy of the temperature control. For example, rather than making thermal contact between the etalon 30 and the cooler 810 only along one surface as is suggested in FIG. 8, the etalon 30 is enclosed (except for windows for the optical beams) in a thermally conductive material in order to reduce thermal gradients across the etalon.

In the examples of FIGS. 8A–8C, the input port 22 and output port 24 are implemented as optical fibers, for example fiber pigtails, and the stages can be coupled to each other by splicing these fibers together. In FIG. 8A, the etalon stage includes a fiber circulator 812 and a single fiber collimator 814 located in the optical path between the input and output ports 22,24 and the etalon 30. The fiber circulator 812 has three fiber ports 813A–C. Light that enters the first fiber 813A exits the second fiber 813B, and light that enters the second fiber 813B exits the third fiber 813C. The single fiber collimator 814 has a single fiber port 815A and a free space "port" 815B. The collimator 814 couples between the fiber 815A and a collimated beam at the free space "port" 815B.

The etalon stage of FIG. 8A operates as follows. The optical signal enters the etalon stage via input fiber 22, which is coupled to the first fiber port 813A of the fiber circulator 812. As a result, the light exits the circulator 812 via the second fiber port 813B, which is coupled to the fiber port 815A of the single fiber collimator 814. The collimator 814 collimates the light into an optical beam 150, which exits the free space port 815B for the etalon 30. When the optical beam 150 returns from the etalon 30, it is coupled by the collimator 814 back into the fiber port 815A. From there, it propagates to the second fiber port 813B of the circulator 812 and exits via the third fiber port 813C into the output fiber 24. Devices other than a circulator can also be used. For example, waveguide couplers and fiber couplers can be used instead, although they typically will add more loss.

The etalon stage in FIG. 8B is conceptually similar to that shown in FIG. 8A, except that the collimator and circulator functions are reversed in order. In this example, the etalon stage includes a dual fiber collimator 822 and a free space circulator 824 located in the optical path between the input and output ports 22,24 and the etalon 30. The dual fiber collimator 822 has two fiber ports 823A–B. It also has two free space "ports" 823C–D. There are two free space ports 823C–D in the sense that an optical signal from fiber 823A is collimated into one free space beam, but an optical signal from fiber 823B is collimated into a different free space beam. "Two" ports does not imply that the two free space beams are required to be physically separate; they can be overlapping in space. In one implementation, a gradient index lens (GRIN lens) is used as the collimating lens in the dual fiber collimator and is designed so that the optical beam has its minimum waist at the etalon 30. Typically, this minimizes the spot sizes within the system and reduces diffraction losses. The free space circulator 824 has three free space ports 825A–C and free space beams circulate from the first port 825A to the second port 825B to the third port 825C. Again, the free space beams from different ports can be physically overlapping at points.

The etalon stage of FIG. 8B operates as follows. The optical signal enters the etalon stage via input fiber 22, which couples the optical signal to the first fiber port 823A of the dual fiber collimator 822. The collimator 822 collimates the light into an optical beam, which exits the free space port 823C for the first port 825A of the circulator 824. The light exits the free space circulator 824 via its second port 825B, directed towards the etalon 30. When the optical beam 150 exits the etalon 30, it returns to the second port 825B of the free space circulator 824. It exits the circulator via its third port 825C and enters free space port 823D of the dual fiber collimator 822, which couples the light into the fiber port 823B and output fiber 24.

The etalon stage in FIG. 8C is physically similar to that shown in FIG. 8B, but there is no circulator 824. In this approach, the optical signal enters the etalon stage via input fiber 22, which is coupled to the first fiber port 823A of the dual fiber collimator 822. The collimator 822 collimates the light into an optical beam, which exits the free space port 823C for the etalon. It returns to free space port 823D. This is because the optical beam is not exactly normally incident on the etalon 30 and the deviation from normal causes the optical beam to return to port 823D rather than to port 823C. Some deviation from normal incidence can be tolerated without significantly affecting the overall performance. A typical tolerance is that the beam is within zero to three degrees of normal to prevent significant effects due to beam walk off, although actual tolerances will depend on the application. If the optical beams from the collimator 822 are at too steep angles, additional optics can reduce the angle to within the etalon's tolerances. For examples, see FIGS. 2–7 of co-pending U.S. patent application Ser. No. 10/206,870, "Dual Fibers Coupled to an Etalon," by Qin Zhang and Hongwei Mao, filed Jul. 26, 2002, now abandoned, which is incorporated herein by reference. To reduce the walk off effect, the reflectivity of the front interface 32 of etalon 30 preferably is low, for example less than 6%. The optical beam entering free space port 823D is coupled into fiber port 823B and output fiber 24. One advantage of this approach is that a circulator (or other similar device) is eliminated.

Figure 9A:
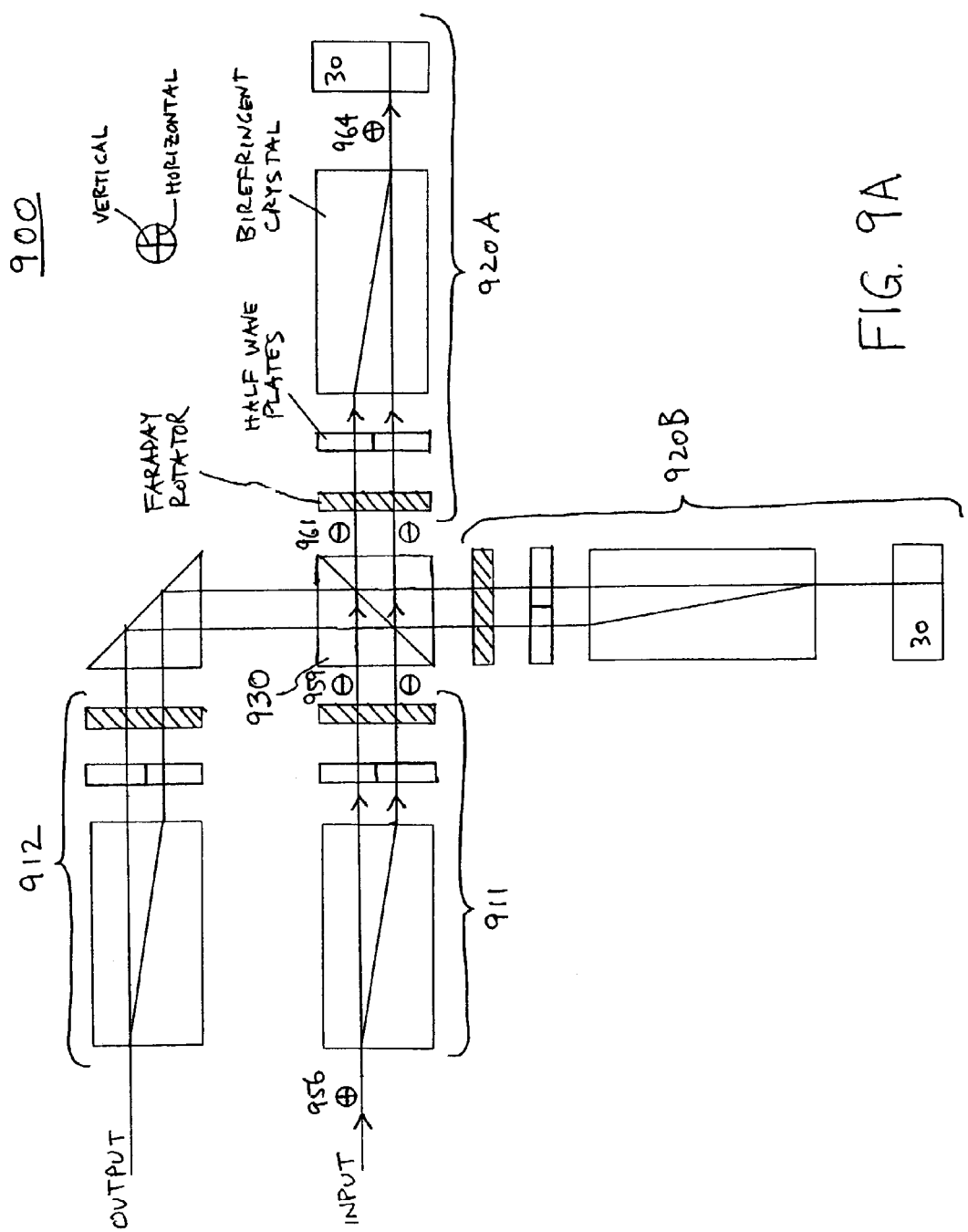
Figure 9C:
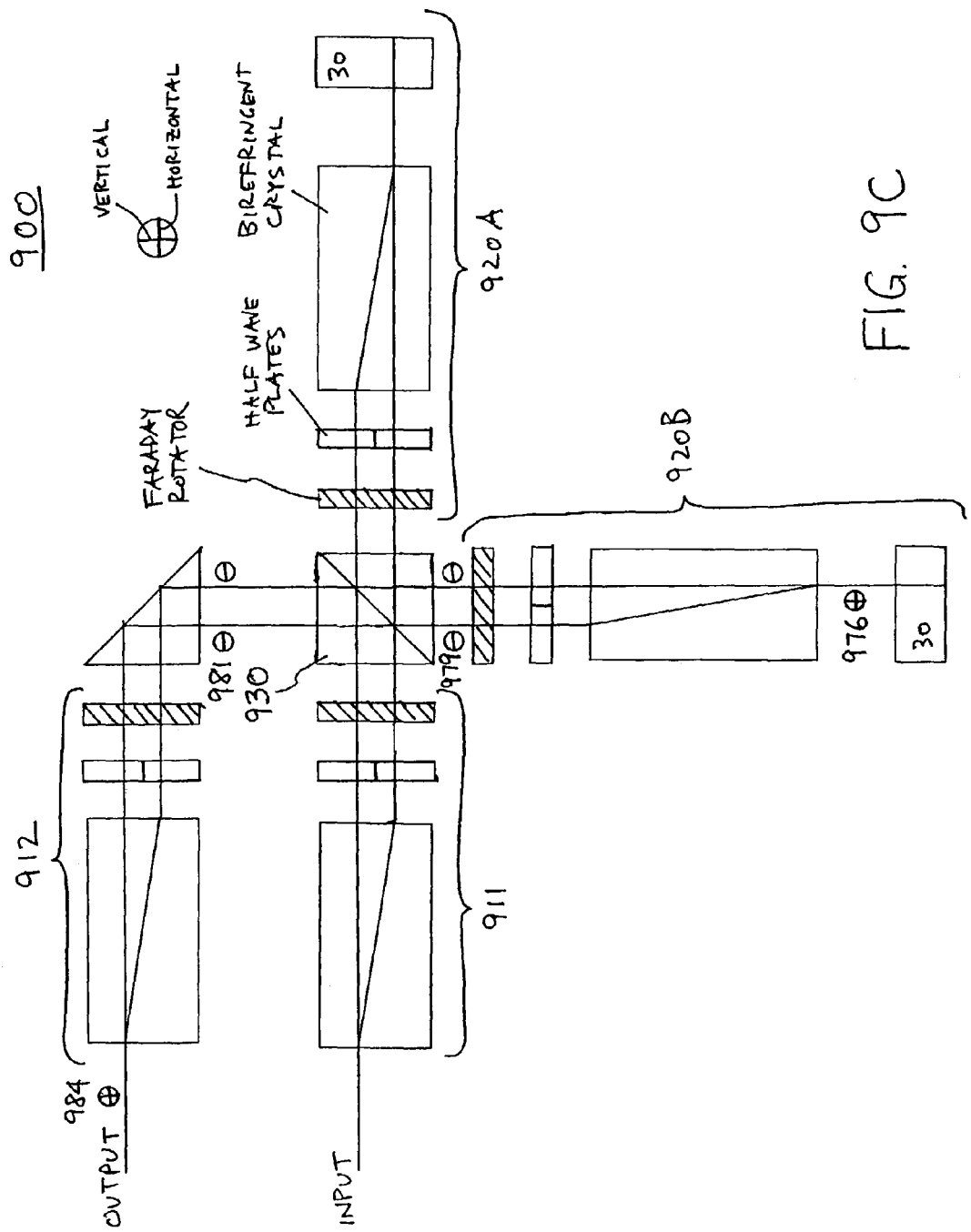
Figure 10:
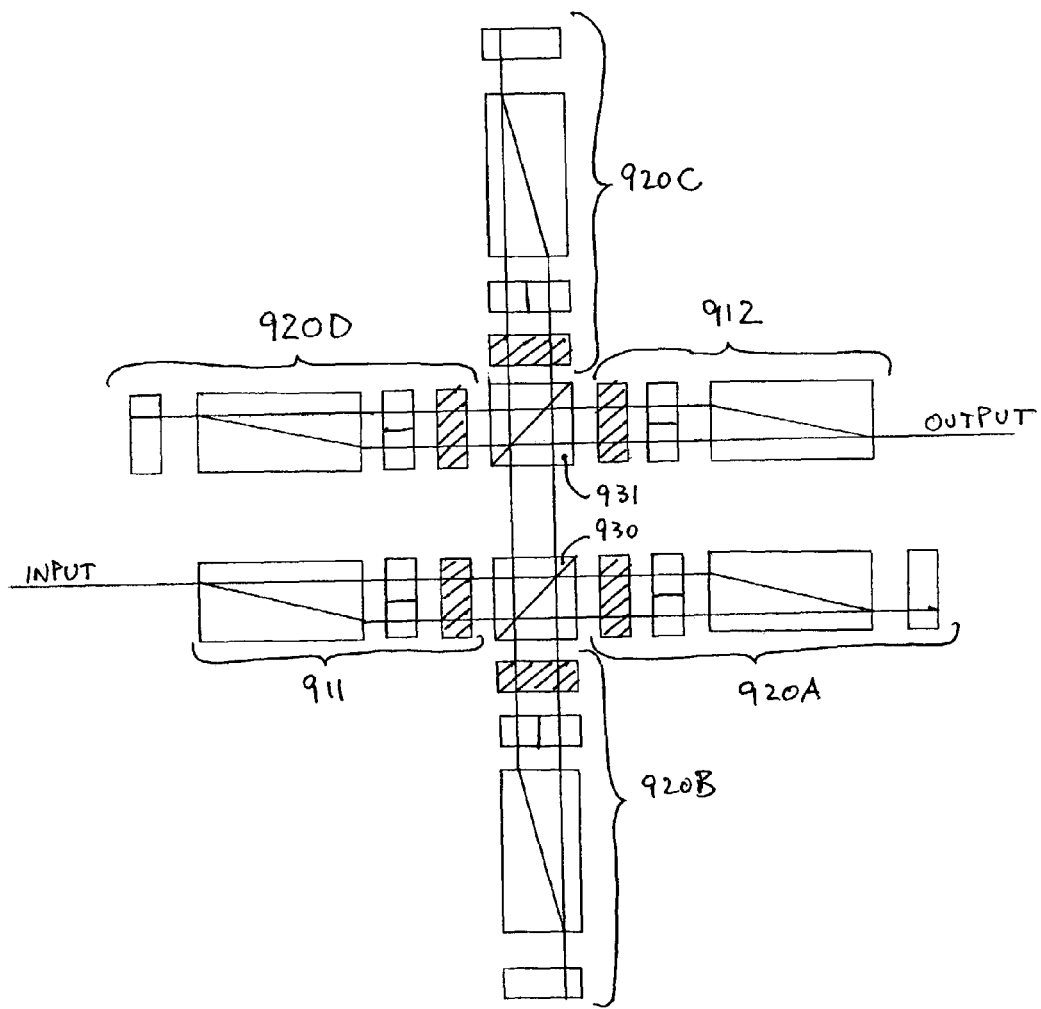
FIG. 10 is a top view of another dispersion compensation system using polarization multiplexing.

FIGS. 9–10 show two examples where etalon stages are coupled to each other via free space optics rather than fibers, as was the case in the examples of FIG. 8. More specifically, the incoming and outgoing optical signals in each stage have different polarizations and a polarizing beamsplitter is used to couple the free space optical signals between stages.

FIGS. 9A–9C are a top view of a dispersion compensation system 900 using polarization multiplexing. The system 900 as shown is free space. If fiber input and output are desired, fiber collimators can be used to couple to the free space system. The system 900 includes an input polarization beam displacer 911, two polarization rotating etalon stages 920A–920B, an output polarization beam combiner 912, and a polarization beam splitter 930. The polarization beam splitter 930 couples the various other elements to each other. The example in FIGS. 9A–9C are shown with specific designs for each of the elements. This is done for clarity, but other designs for the polarization beam displacer/combiners 911,912 and polarization rotating etalon stages 920 will be apparent.

The polarization beam displacer 911 receives an unpolarized optical beam and separates it into two component beams that have the same polarization but are laterally separated. Each component beam corresponds to one of the polarizations in the original unpolarized optical beam. In a typical design, a birefringent crystal separates the unpolarized beam into two component beams with different polarizations, and some combination of wave plates and/or Faraday rotators rotates the polarization of the two components beams.

The polarization beam combiner 912 receives two component beams that are laterally separated but have the same polarization and combines them into a single, unpolarized optical beam in which each polarization corresponds to one of the component beams. In a typical design, wave plates and/or Faraday rotators rotate the polarization of the two components beams so that they are orthogonal, and a birefringent crystal then recombines the component beams. The polarization beam combiner 912 basically performs the reverse function of the polarization beam displacer 911.

Often, a device that functions as a polarization beam displacer in one direction can also operate as a polarization beam combiner in the reverse direction by reversing the direction of magnetic field applied on the Faraday Rotator. These types of devices shall be referred to as polarization beam displacer/combiners. They have advantage in reducing the overall part count since a single component can be used as both the polarization beam displacer 911 and polarization beam combiner 912. For the remainder of these examples, the polarization beam displacer 911 and polarization beam combiner 912 shall be referred to as polarization beam displacer/combiners.

The etalon stages 920 are polarization rotating etalon stages. In other words, not only do the incoming optical beams pass through the etalon 30 in the etalon stage 920, but the etalon stage 920 also rotates the polarization of the optical beams to an orthogonal polarization. In the examples shown here, each etalon stage 920 receives two component beams that have the same polarization. The etalon stage recombines these into an unpolarized beam that is incident on the etalon 30. This simplifies the etalon design since both polarizations enter the etalon at the same location. In contrast, if the component beams were not recombined, each component beam would enter the etalon at a different location and, for example, better temperature control would be required to ensure that the temperatures of the two locations were the same. The etalon stage then separates the single return beam from the etalon 30 into two component beams that have the same polarization, but that is orthogonal to that of the incoming component beams.

In this approach, the polarization rotating etalon stage 920 functions similarly to the polarization beam displacer/combiners. As a result, typical designs can use birefringent crystals, wave plates and/or Faraday rotators for the same purposes as in the polarization beam displacer/combiner. In the examples shown in FIGS. 9–10, the same basic design is used for the polarization beam displacer 911, etalon stages 920 and polarization beam combiner 912, in order to reduce the parts count. It can also result in symmetric optical paths for the two component beams, thus reducing or eliminating any time delay between the two beams (i.e., polarization mode dispersion).

Returning to FIG. 9, FIGS. 9A–9C show the path of an optical beam through the system 900. The circular symbols indicate the state of polarization of different optical beams at various locations along the optical path. Referring to the symbol in the upper right of the figure and recalling that the figure is a top view, a right-left line in the circular symbol indicates horizontal polarization (i.e., parallel to the plane of the paper) and an up-down line indicates vertical polarization (i.e., perpendicular to the plane of the paper). Both lines together indicate unpolarized light. The internal operation of the polarization beam displacer/combiners and the polarization rotating etalon stages is not discussed in the following discussion, as it is deferred to the more detailed FIG. 11.

Beginning with FIG. 9A, unpolarized light 956 enters the input polarization beam displacer 911, which separates it into two component beams 959, both of which are horizontally polarized. The polarization beam splitter 930 passes the two component beams 959 to the first etalon stage 920A, as shown by symbols 961. The etalon stage 920A recombines the two component beams 961 into a single unpolarized beam 964, which propagates through the etalon 30. Note that both component beams travel the same optical distance so that no relative time delay is introduced. In FIG. 9B, the unpolarized beam 966 returning from the etalon 30 is separated into two component beams 969. These component beams 969 are vertically polarized. This is orthogonal to the horizontally polarized incoming component beams 961 of FIG. 9A. As a result, the polarization beam splitter 930 reflects these beams to the second etalon stage 920B, as shown by symbols 971. The second etalon stage 920B combines the two component beams 971 into a single unpolarized beam 974, which propagates through the etalon 30. Again, both component beams travel equal optical distances. In FIG. 9C, the unpolarized return beam 976 is separated into two horizontally polarized component beams 979. These pass through the polarization beam splitter 930 (to 981) and are combined by the output polarization beam combiner 912 into an unpolarized output beam 984. In this example, a prism folds the optical path so that the input and output are on the same side of the device.

FIG. 10 shows the same basic approach extended to four etalon stages 920A–D. The system in FIG. 10 is the same as that of FIG. 9, except two additional etalon stages 920C and 920D are included between the second etalon stage 920B and the output polarization beam combiner 912. An additional polarization beam splitter 931 is used to route the optical beams. In short, horizontally polarized optical beams from the second stage 920B pass through the two beam splitters 930,931 en route to the third stage 920C. They exit the third stage 920C as vertically polarized and reflect off polarization beam splitter 931 to the fourth stage 920D. They exit the fourth stage 920D as horizontally polarized, pass through the polarization beam splitter 931 and are recombined by the output polarization beam combiner 912.

The examples in FIGS. 9–10 use polarization multiplexing to couple the etalon stages. One advantage of this approach is low loss and compact package size. Polarization multiplexing avoids the higher loss that is inherent in other coupling approaches.

Embodiments besides those shown in FIGS. 9–10 will be apparent. For example, one or three etalon stages can be realized by replacing the last etalon stage 920B or 920D in FIGS. 9 and 10 with the output polarization beam combiner 912. More etalon stages can be realized by further extending the basic design. In addition, it is not necessary for all etalon stages to be coupled by free space. For example, a four-stage design can be realized by using two modules, each of which is a two-stage design shown in FIG. 9. But instead of coupling the two modules using free space, the input and output of each module can be optical fibers and the two modules are coupled to each other by optical fiber. This results in modularity, as multi-stage systems can be built up by cascading the basic two-stage module. One-stage modules can also be used if an odd number of stages is desired. As a final variation, free space coupling techniques besides polarization multiplexing can be used. For example, dual fiber collimators can be used to couple light to and from the etalon. One drawback of this approach is that it has a higher insertion loss ripple because the beam is not exactly normally incident. It typically has a small (approximately 3 degree) angle of incidence.

Figure 11A:
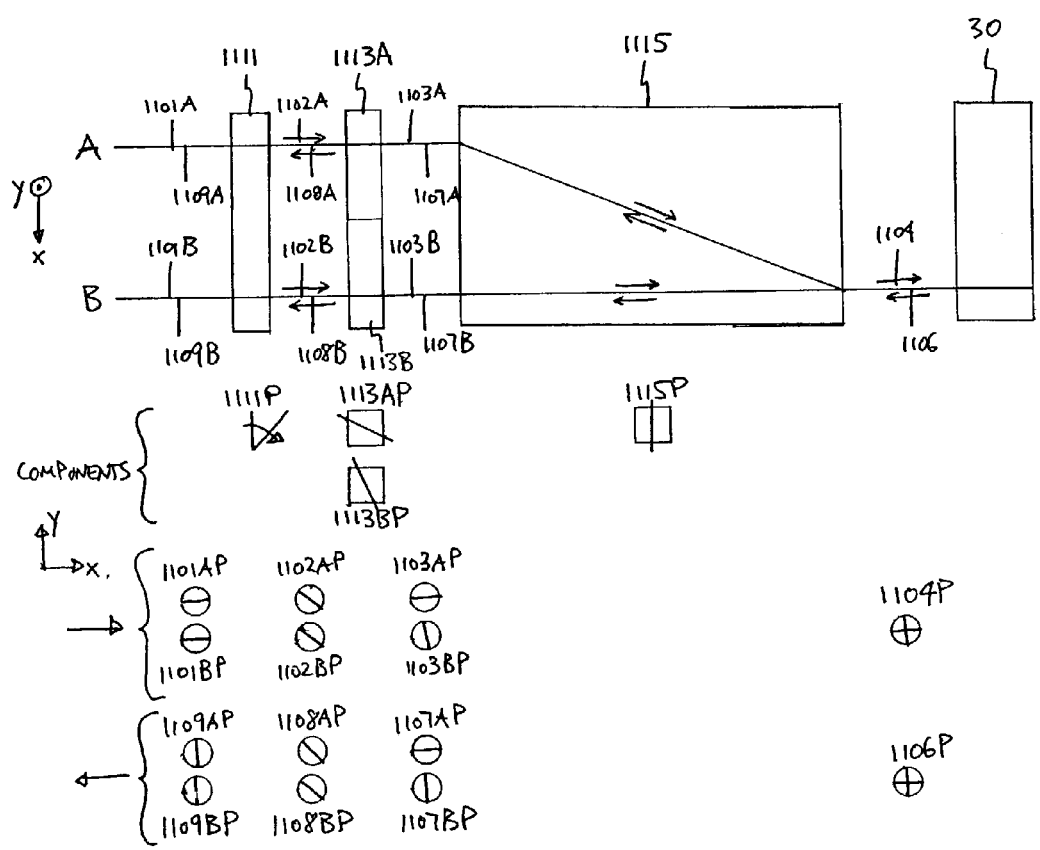
FIGS. 11A–11B are top views of different polarization rotating etalon stages.
Figure 11B:
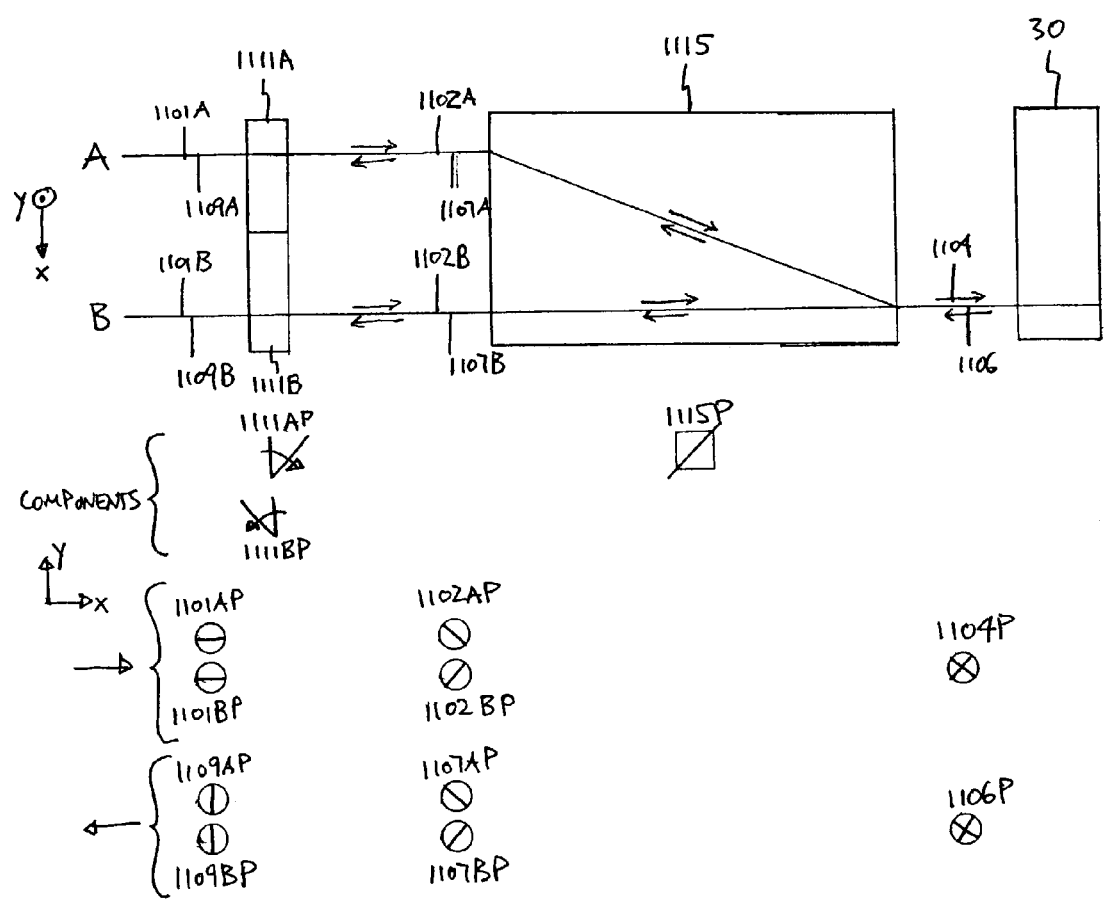

FIGS. 11A–11B are top views of different polarization rotating etalon stages. Operation of these stages is described in the context of two incoming component beams 1101A,B that are polarized in one direction. The beams are combined into an unpolarized beam 1104 incident on the etalon 30. On the return path, the unpolarized beam 1106 is separated into two component beams 1109A,B that are polarized orthogonal to incoming beams 1101A,B. The etalon stages shown can be modified in a straightforward manner, if necessary at all, to accommodate incoming component beams that have polarizations different than those shown in FIGS. 11A–11B.

The reference numbers 1101–1104 refer to the optical beam propagating to the etalon, and 1106–1109 refer to the optical beam returning from the etalon. Suffixes A and B refer to corresponding component beams. The view of the etalon stage is a top view. A left handed coordinate system is used. The x axis is towards the bottom of the figure, y is upward out of the plane of the figure, and z is to the right of the figure. The incoming beam propagates in the +z direction and returns in the −z direction.

There are three sets of symbols beneath the optical elements. The top set of symbols shows the polarization characteristics of different elements in the etalon stage. The middle set shows the polarization characteristics of an optical beam propagating in the +z direction. The bottom set shows the polarization characteristics of the return optical beam propagating in the −z direction. The suffix P shows correspondence between the polarization symbols and the optical beams. For example, the polarization state of component beam 1102A is shown by symbol 1102AP. For the polarization symbols, x is to the right of the figure and y is to the top of the figure. Angles are measured from the y axis, with positive angles corresponding to clockwise rotation (i.e., moving from the y axis towards the x axis).

In the example of FIG. 11A, the etalon stage includes one Faraday rotator 1111, and two half wave plates 1113A,B, one for each component beam, and a birefringent crystal 1115. The Faraday rotator 1111 affects both A and B component beams and rotates polarization by 45 degree in the clockwise direction, as indicated by symbol 1111P. The axis for half wave plate 1113A is oriented at an angle of +22.5 degrees 1113AP (i.e., 22.5 degrees short of −90 degrees). The axis for half wave plate 1113B is oriented at an angle of −22.5 degrees 1113BP. The birefringent crystal 1115 is oriented so that the ordinary beam is vertically polarized 1115P.

In the forward direction, two component beams 1101A,B enter the etalon stage as horizontally polarized 1101AP, 1101BP and are rotated by the Faraday rotator 1111 to −45 degrees 1102AP,1102BP. The A beam passes through the half wave plate 1113A, which rotates the polarization to horizontal 1103AP. The B beam passes through the half wave plate 1113B, which rotates the polarization to vertical 1103BP. The birefringent crystal 1115 combines the two orthogonally polarized components beams 1103A,B into the unpolarized beam 1104.

On the return trip, the birefringent crystal 1115 and half wave plates 1113A,B operate in reverse to produce two component beams 1108A,B with 45 degree polarizations 1108AP,1108BP. The Faraday rotator 1111 adds 45 degrees of clockwise rotation. The exiting component beams 1109A,B are vertically polarized 1109AP,1109BP.

In FIG. 11B, there are no wave plates but there are two Faraday rotators 1111A,B, one for each component beam. Faraday rotator 1111A introduces a 45 degree clockwise rotation 1111AP and Faraday rotator 1111B introduces a 45 degree counterclockwise rotation 1111BP. The birefringent crystal 1115 is oriented so that the ordinary beam is polarized 1115P at a +45 degree angle.

In the forward direction, horizontally polarized component beam 1101A is rotated by the Faraday rotator 1111A to 45 degrees 1102AP. Horizontally polarized component beam 1101B is rotated by the Faraday rotator 1111B to +45 degrees 1102BP. The birefringent crystal 1115 combines the two components beams 1102A,B into the unpolarized beam 1104. On the return trip, the orthogonally polarized component beams 1107A,B from the birefringent crystal 1115 are rotated in opposite directions by the Faraday rotators 1111A, B. The result is two vertically polarized component beams 1109A,B.

In the examples shown in FIG. 11, the Faraday rotator 1111 introduces a nonreciprocal polarization rotation, causing the outgoing component beams 1109 to have a polarization that is orthogonal to the incoming beams 1101. Materials that exhibit the Faraday effect include glasses, yttrium-iron-garnet (YIG), terbium-gallium-garnet (TGG), terbium-aluminum-garnet (TbAIG) and bismuth-iron-garnet (BIG). The birefringent crystal 1115 separates and combines the components beams into a single unpolarized beam. The wave plates 1113, if any, provide intermediate polarization rotations. They can also provide some isolation from reflected beams. Designs other than those shown in FIG. 11 will be apparent. For example, the component beams 1101 can be separated in the y direction rather than the x direction, or at an angle to the x and y directions.

The etalon stages shown in FIG. 11 can also function as polarization beam displacers and polarization beam combiners. In the forward direction, the etalon stage receives two component beams 1101 and combines them into a single unpolarized beam 1104. That is, it functions as a polarization beam combiner. In the return direction, the etalon stage separates an unpolarized beam 1106 into two components beams 1109 that have the same polarization but are laterally displaced relative to each other. It functions as a polarization beam displacer. One advantage of using the same basic design for the polarization beam displacer, etalon stage and polarization beam combiner is that the parts count is reduced. Another advantage is that differences in optical path length between the two component beams are more easily minimized or eliminated. For example, referring to FIG. 9A, the optical path traversed by the A component beam is the same length as the optical path traversed by the B component beam.

Although the invention has been described in considerable detail with reference to certain preferred embodiments thereof, other embodiments will be apparent. For example, different types of etalon stages can be combined to form a dispersion compensation system. The etalon stages need not be identical in design. As one example, a dispersion compensation system combines etalon stages of FIG. 8A (or 8B), which are used when the front interface of the etalon has a high reflectivity, and etalon stages of FIG. 8C, which are used for low reflectivity etalons. As another example, the etalon stages described herein can be combined with more complex etalon stages, for example stages in which the reflectivity of the etalon's front interface is tunable. For examples, see co-pending U.S. patent application Ser. No. 10/215,559, "Multi-channel Compensation of Chromatic Dispersion Slope using Etalons with Wavelength Dependent Variable Reflectivity," by Qin Zhang et al., filed Aug. 9, 2002, which is incorporated herein by reference.

As another example, for clarity, etalon stages have been illustrated showing only the most relevant components in the optical path, but additional components can be located in the optical path. For example, in cases where the OPL is tunable by translating the point of incidence of an optical beam on the etalon, a device for translating the beam can be located in the optical path. For examples of approaches to beam translation, see FIGS. 12–18 of the U.S. patent application Ser. No. 10/215,559 referenced above.

Another alternative is to use a non-tunable design. For example, athermal etalon designs, such as shown in FIG. 2B, can significantly reduce or even eliminate the need for temperature control. Some applications do not require tunability. For example, the dispersion compensation required may be fixed. If tunability is not required for the application, then the etalons can be made non-tunable. Or they can be tunable in order to compensate for manufacturing variations, but tuned once (typically at the manufacturer or prior to field installation) without further on-going tuning. This way, the dispersion compensation system can be both entirely passive and non-dynamic. Advantages of a passive, non-dynamic design include higher reliablility, lower insertion loss and simpler integration into existing systems. Different dispersion values can be realized by having multiple sets of non-tunable systems, similar to the approach used by dispersion compensating fibers (DCF).

Other variations will be apparent. Therefore, the scope of the appended claims should not be limited to the description of the preferred embodiments contained herein.

What is claimed is:

1. A dispersion compensation system comprising:
   at least two etalon stages optically coupled in series, each etalon stage comprising:
      an input port;
      an output port;
      an optical path from the input port to the output port; and
      an etalon located in the optical path, the etalon having a front reflective interface and a back reflective interface;
   wherein, in at least two of the etalon stages, an optical path length (OPL) of the etalon is tunable and a reflectivity of the front reflective interface of the etalon is non-tunable; and
   wherein, within an operating bandwidth, the dispersion compensation system can be tuned to compensate for at least two different chromatic dispersions by tuning the OPLs of the etalons.

2. The dispersion compensation system of claim 1 wherein, in all of the etalon stages, an OPL of the etalon is tunable and a reflectivity of the front reflective interface of the etalon is non-tunable.

3. The dispersion compensation system of claim 2 comprising at least three etalon stages optically coupled in series, wherein each etalon stage further comprises:
   a temperature controller thermally coupled to the etalon for controlling a temperature of the etalon, wherein varying the temperature of the etalon tunes the OPL of the etalon.

4. The dispersion compensation system of claim 2 comprising at least three etalon stages optically coupled in series, wherein the OPL of each etalon is athermal.

5. The dispersion compensation system of claim 1 wherein at least two of the OPL-tunable etalons have front reflective interfaces that have a same reflectivity.

6. The dispersion compensation system of claim 1 wherein, within the operating bandwidth, the dispersion compensation system can be tuned over a range of chromatic dispersions of at least −500 ps/nm to +500 ps/nm.

7. The dispersion compensation system of claim 1 wherein the operating bandwidth includes a plurality of evenly spaced channels.

8. The dispersion compensation system of claim 7 wherein:
   a channel spacing of the channels is consistent with an ITU grid;

the FSR of each etalon is within 5% of the channel spacing; and the plurality of channels spans one of the following communications bands: the C-band (1528–1565 nm), the L-band (1565–1610 nm) and the S-band (1420–1510 nm).

9. The dispersion compensation system of claim 7 wherein the operating bandwidth within each channel is at least 50% of a channel spacing between the channels.

10. The dispersion compensation system of claim 7 wherein:
    a channel-to-channel variation of chromatic dispersion is characterized by a dispersion slope and a dispersion offset; and
    the dispersion compensation system can be tuned to compensate for at least two different combinations of dispersion slope and dispersion offset.

11. The dispersion compensation system of claim 10 wherein:
    a channel spacing of the channels is consistent with an ITU grid;
    the FSR of each etalon is within 5% of the channel spacing; and
    the dispersion compensation system can be tuned over a range of dispersion slopes of at least 10 ps/nm$^2$.

12. The dispersion compensation system of claim 10 wherein:
    a channel spacing of the channels is consistent with an ITU grid;
    the FSR of each etalon is within 5% of the channel spacing; and
    the different combinations of dispersion slope and dispersion offset correspond to different types and lengths of optical fiber.

13. The dispersion compensation system of claim 1 wherein each etalon stage having an OPL-tunable etalon further comprises:
    a temperature controller thermally coupled to the etalon for controlling a temperature of the etalon, wherein varying the temperature of the etalon tunes the OPL of the etalon.

14. The dispersion compensation system of claim 1 wherein the OPL of each OPL-tunable etalon is athermal.

15. The dispersion compensation system of claim 1 wherein each OPL-tunable etalon comprises:
    an air space; and
    a tiltable transparent plate located in the air space, wherein tilting the transparent plate tunes the OPL of the etalon.

16. The dispersion compensation system of claim 1 wherein the front reflective interface for at least one etalon comprises:
    an interface between an uncoated body of the etalon and a surrounding material.

17. A dispersion compensation system comprising:
    at least two etalon stages optically coupled in series, each etalon stage comprising:
    an input port;
    an output port;
    an optical path from the input port to the output port; and
    an etalon located in the optical path, the etalon having a front reflective interface with non-tunable reflectivity and a back reflective interface; and
    wherein, within an operating bandwidth that includes a plurality of evenly spaced channels, the dispersion compensation system compensates for chromatic dispersion including a channel-to-channel variation of the chromatic dispersion.

18. The dispersion compensation system of claim 17 wherein at least two of the etalons have front reflective interfaces that have a same reflectivity.

19. The dispersion compensation system of claim 17 wherein the channel-to-channel variation of the chromatic dispersion spans a range of at least 100 ps/nm.

20. The dispersion compensation system of claim 17 wherein:
    a channel spacing of the channels is consistent with an ITU grid;
    the FSR of each etalon is within 5% of the channel spacing; and
    the plurality of channels spans one of the following communications bands: the C-band (1528–1565 nm), the L-band (1565–1610 nm) and the S-band (1420–1510 nm).

21. The dispersion compensation system of claim 17 wherein the operating bandwidth within each channel is at least 50% of a channel spacing between the channels.

22. The dispersion compensation system of claim 17 wherein the channel to channel variation of the chromatic dispersion has a dispersion slope with magnitude of at least 5 ps/nm$^2$.

23. The dispersion compensation system of claim 17 wherein each etalon stage further comprises:
    a temperature controller thermally coupled to the etalon for maintaining a temperature of the etalon at a predetermined value.

24. The dispersion compensation system of claim 17 wherein the OPL of each etalon is athermal.

25. The dispersion compensation system of claim 17 wherein each etalon comprises:
    an air space; and
    a tiltable transparent plate located in the air space, wherein the transparent plate is fixed at a predetermined tilt.

26. The dispersion compensation system of claim 17 wherein the front reflective interface for at least one etalon comprises:
    an interface between an uncoated body of the etalon and a surrounding material.

27. A dispersion compensation system for compensating for chromatic dispersion within an operating bandwidth, the dispersion compensation system comprising:
    an input polarization beam displacer for separating an unpolarized input optical beam into two laterally separated component beams that have a same polarization;
    an output polarization beam combiner for combining two laterally separated components beams that have a same polarization into a single unpolarized output optical beam;
    at least two polarization rotating etalon stages optically coupled in series, each etalon stage comprising an input port, an output port, an optical path from the input port to the output port; and an etalon located in the optical path, wherein the polarization rotating etalon stage rotates the polarization of incoming component beams to an orthogonal polarization; and
    at least one polarization beamsplitter positioned to direct the component beams from the input polarization beam displacer through the polarization rotating etalon stages to the output polarization beam combiner.

28. The dispersion compensation system of claim 27 wherein each etalon stage further comprises:
a Faraday rotator and a birefringent crystal located in the optical path between the input and output ports and the etalon.

29. The dispersion compensation system of claim 27 wherein an optical path through the dispersion compensation system traversed by one component beam is equal in length to an optical path through the dispersion compensation system traversed by the other component beam.

30. The dispersion compensation system of claim 27 wherein the dispersion compensation system is organized into at least two modules optically coupled in series by optical fiber, each module comprising:
an input polarization beam displacer for separating an unpolarized input optical beam into two laterally separated component beams that have a same polarization;
one or two of the polarization rotating etalon stages;
an output polarization beam combiner for combining two laterally separated components beams that have a same polarization into a single unpolarized output optical beam; and
a polarization beamsplitter positioned to direct the component beams from the input polarization beam displacer through the polarization rotating etalon stage(s) to the output polarization beam combiner.

31. An etalon stage comprising:
an input port;
an output port;
an optical path from the input port to the output port; and
an etalon located in the optical path, the etalon having a front reflective interface and a back reflective interface, wherein an OPL of the etalon is tunable and a reflectivity of the front reflective interface of the etalon is non-tunable
wherein only a dual fiber collimator is located in the optical path between the input and output ports and the etalon, and wherein the reflectivity of the front reflective interface of the etalon is less than 6%.

32. The etalon stage of claim 31 further comprising:
a temperature controller thermally coupled to the etalon for controlling a temperature of the etalon, wherein varying the temperature of the etalon tunes the OPL of the etalon.

33. The etalon stage of claim 31 wherein:
the OPL of the etalon is athermal; and
the etalon comprises an air space and a tiltable transparent plate located in the air space, wherein tilting the transparent plate tunes the OPL of the etalon.

34. The etalon stage of claim 31 wherein the front reflective interface comprises:
an interface between an uncoated body of the etalon and a surrounding material.

35. The etalon stage of claim 31 wherein the front reflective interface comprises:
a dielectric coating with at least one layer.

36. The etalon stage of claim 31 wherein the reflectivity of the front reflective interface varies as a function of wavelength.

37. The etalon stage of claim 31 further comprising:
a fiber circulator and a single fiber collimator located in the optical path between the input and output ports and the etalon.

38. The etalon stage of claim 31 further comprising:
a dual fiber collimator and a free space circulator located in the optical path between the input and output ports and the etalon.

39. In a dispersion compensation system comprising at least two etalon stages optically coupled in series, each etalon stage including an etalon having a non-tunable front reflective interface and a tunable OPL, a method for compensating for chromatic dispersion, the method comprising:
receiving an optical signal;
in the OPL-tunable etalon stages, tuning the OPL of the etalon to compensate for a chromatic dispersion selected from at least two possible chromatic dispersions; and
propagating the received optical signal through the etalon stages.

40. The method of claim 39 wherein tuning the OPL of the etalon comprises:
tuning a temperature of the etalon.

41. The method of claim 40 wherein an optical path traversed by one component beam is equal in length to an optical path traversed by the other component beam.

42. The method of claim 39 wherein tuning the OPL of the etalon comprises:
tilting a transparent plate located in a body of the etalon.

43. The method of claim 39 wherein tuning the OPL of the etalon comprises:
looking up a target parameter that corresponds to the chromatic dispersion to be compensated; and
adjusting the etalon to match the target parameter.

44. The method of claim 39 further comprising:
separating the received optical signal into two laterally separated component beams that have a same polarization; and
after propagating the component beams through the etalon stages, combining the two laterally separated components beams into a single unpolarized output optical beam.

* * * * *